US008224678B2

(12) United States Patent
Paradis et al.

(10) Patent No.: US 8,224,678 B2
(45) Date of Patent: Jul. 17, 2012

(54) SYSTEMS AND METHODS FOR TRACKING HEALTH-RELATED SPENDING FOR VALIDATION OF DISABILITY BENEFITS CLAIMS

(75) Inventors: Kenneth Paradis, Boxford, MA (US); Robert T. Lewis, Medford, NJ (US); Dick Smith, Lincoln, NE (US); Jack Edgar West, Tampa, FL (US)

(73) Assignee: Ametros Financial Corporation, North Reading, MA (US)

( * ) Notice: Subject to any disclaimer, the term of this patent is extended or adjusted under 35 U.S.C. 154(b) by 185 days.

(21) Appl. No.: 12/687,250

(22) Filed: Jan. 14, 2010

(65) Prior Publication Data

US 2010/0185466 A1 Jul. 22, 2010

Related U.S. Application Data

(60) Provisional application No. 61/145,810, filed on Jan. 20, 2009.

(51) Int. Cl.
*G06Q 40/00* (2012.01)
(52) U.S. Cl. ............................................. 705/4
(58) Field of Classification Search ........................ 705/4
See application file for complete search history.

(56) References Cited

U.S. PATENT DOCUMENTS

| | | | |
|---|---|---|---|
| 6,343,271 B1 | 1/2002 | Peterson et al. | |
| 7,685,000 B1 | 3/2010 | Petit et al. | |
| 7,725,329 B2 | 5/2010 | Kil et al. | |
| 7,912,734 B2 | 3/2011 | Kil | |
| 2002/0049617 A1* | 4/2002 | Lencki et al. | 705/4 |
| 2003/0018496 A1* | 1/2003 | Hambright et al. | 705/2 |
| 2004/0064386 A1 | 4/2004 | Goguen et al. | |
| 2005/0108063 A1 | 5/2005 | Madill et al. | |
| 2005/0125259 A1 | 6/2005 | Annappindi | |
| 2006/0080132 A1 | 4/2006 | Hall et al. | |
| 2006/0085230 A1 | 4/2006 | Brill et al. | |
| 2006/0089862 A1* | 4/2006 | Anandarao et al. | 705/4 |

(Continued)

FOREIGN PATENT DOCUMENTS

WO WO-2009/111287 A2 9/2009

(Continued)

OTHER PUBLICATIONS

"Crowe Paradis Enters the Custodial Management Business". Medicare Set Aside Services: The Official Medicare Set Aside Blog and Information Resource, Nov. 17, 2010 (5 pages).

(Continued)

*Primary Examiner* — Rajesh Khattar
(74) *Attorney, Agent, or Firm* — Choate, Hall & Stewart, LLP

(57) ABSTRACT

A method for tracking health-related spending for validation of disability benefits claims includes receiving, by a Medicare Secondary Payer statute-compliance company, from an authorization server, an identification of an approved transaction initiated by a recipient of insurance settlement funds to acquire at least one of a healthcare-related service and a healthcare-related good by a provider, the recipient authorized to receive the at least one of the healthcare-related service and the healthcare-related good from the provider. The method includes tracking, by the Medicare Secondary Payer statute-compliance company, healthcare-related expenditures by the recipient. The method includes generating, by the Medicare Secondary Payer statute-compliance company, a statement of approved transactions. The method includes transmitting, by the Medicare Secondary Payer statute-compliance company, to a disability benefit provider, the statement of approved transactions.

17 Claims, 7 Drawing Sheets

U.S. PATENT DOCUMENTS

| | | | |
|---|---|---|---|
| 2006/0111941 | A1 | 5/2006 | Blom |
| 2006/0129427 | A1 | 6/2006 | Wennberg |
| 2006/0129428 | A1 | 6/2006 | Wennberg |
| 2006/0136273 | A1 | 6/2006 | Zizzamia et al. |
| 2006/0217824 | A1 | 9/2006 | Allmon et al. |
| 2007/0005402 | A1 | 1/2007 | Kennedy et al. |
| 2007/0011030 | A1 | 1/2007 | Bregante et al. |
| 2007/0011032 | A1 | 1/2007 | Bregante et al. |
| 2007/0016542 | A1 | 1/2007 | Rosauer et al. |
| 2007/0083399 | A1 | 4/2007 | Bryan |
| 2007/0118393 | A1 | 5/2007 | Rosen et al. |
| 2007/0244720 | A1 | 10/2007 | Walker |
| 2008/0010086 | A1 | 1/2008 | Skelly et al. |
| 2008/0010096 | A1 | 1/2008 | Patterson et al. |
| 2008/0015968 | A1 | 1/2008 | Van Lucene et al. |
| 2008/0046317 | A1 | 2/2008 | Christianson et al. |
| 2008/0154634 | A1 | 6/2008 | Willette et al. |
| 2008/0177567 | A1 | 7/2008 | Friedlander et al. |
| 2008/0183508 | A1 | 7/2008 | Harker et al. |
| 2008/0215376 | A1 | 9/2008 | Engelman |
| 2008/0275729 | A1 | 11/2008 | Taggart et al. |
| 2008/0306778 | A1 | 12/2008 | Dutta et al. |
| 2008/0306872 | A1 | 12/2008 | Felsher |
| 2009/0048877 | A1 | 2/2009 | Binns et al. |
| 2009/0055003 | A1 | 2/2009 | Tunick et al. |
| 2009/0222290 | A1 | 9/2009 | Crowe |
| 2010/0010909 | A1* | 1/2010 | Marshall et al. ............ 705/26 |
| 2010/0145734 | A1 | 6/2010 | Becerra et al. |
| 2010/0185466 | A1 | 7/2010 | Paradis et al. |
| 2011/0029321 | A1 | 2/2011 | Rourke et al. |
| 2012/0059677 | A1 | 3/2012 | Crowe |

FOREIGN PATENT DOCUMENTS

| | | | |
|---|---|---|---|
| WO | WO-2010/085447 | A1 | 7/2010 |

OTHER PUBLICATIONS

"The Way We Were". Medicare Set Aside Services: The Official Medicare Set Aside Blog and Information Resource, Nov. 18, 2010 (5 pages).

"Health Advocates, Inc". Alleged date Mar. 23, 2002. Accessed via WayBack Machine Beta Internet Archives, Oct. 14, 2011.

"Gould & Lamb Healthcare Consultants, LLC". Alleged date Jun. 14, 2002. Accessed via WayBack Machine Beta Internet Archives, Oct. 14, 2011.

"Crowe, Paradis & Albren, LLP". Alleged date Feb. 7, 2005. Accessed via WayBack Machine Beta Internet Archives, Oct. 14, 2011.

"Medval". Alleged date Dec. 20, 2003. Accessed via WayBack Machine Beta Internet Archives, Oct. 14, 2011.

"NuQuest Resources: Pathways to Productivity". Alleged date Jul. 14, 2002. Accessed via WayBack Machine Beta Internet Archives, Oct. 14, 2011.

International Search Report for PCT/US2010/021378, mailed Feb. 23, 2010, (2 pages).

"Audit Solutions," Solutions, Valen Technologies, www.valen.com/audit_solution.htm, p. 1, Apr. 3, 2008, obtained by accessing Wayback Machine, available at www.archive.org.

"Claim Scoring," Claim Analytics, www.claimanalytics.com/ourproducts.htm, pp. 1-2, Mar. 24, 2004, obtained by accessing Wayback Machine, available at www.archive.org.

"ISO Risk Analyzer Overview," ISO, www.iso.com, May 23, 2007, pp. 1-2, obtained by accessing Wayback Machine, available at www.archive.org.

"Predictive Modeling," Program Development & Research, Social Security Administration, U.S. Government, Apr. 3, 2007, p. 1, obtained by accessing Wayback Machine, available at www.archive.org.

"Predictive Modeling," Program Development & Research, Social Security Administration, U.S. Government, http://www.ssa.gov/disabilityresearch/projects.htm#predmod, p. 3, Jun. 18, 2009.

"Workers' Compensation: Commutation of Future Benefits". The "Patel Memo", published on Jul. 23, 2001 (17 pages).

"Workers' Compensation Frequently Asked Questions". Medicare Secondary Payer, Medicare CMS Memoranda, published on Apr. 22, 2003 (12 pages).

"Workers' Compensation Additional Frequently Asked Questions". Medicare Secondary Payer, Medicare CMS Memoranda, published on May 23, 2003 (3 pages).

"Workers' Compensation Information". Medicare Secondary Payer, Medicare CMS Memoranda, published on May 7, 2004 (2 pages).

"Workers' Compensation Additional Frequently Asked Questions". Medicare Secondary Payer, Medicare CMS Memoranda, published on Oct. 15, 2004 (3 pages).

"Workers' Compensation Additional Frequently Asked Questions". Medicare Secondary Payer, Medicare CMS Memoranda, published on Jul. 11, 2005 (7 pages).

"Workers' Compensation Medicare Set-Aside Arrangements Questions and Answers". Medicare CMS Memoranda, published on Dec. 30, 2005 (4 pages).

"Workers' Compensation Medicare Set-Aside Arrangements and Revision of the Low Dollar Threshold for Medicare Beneficiaries". Medicare CMS Memoranda, published on Apr. 25, 2006 (1 page).

"Questions and Answers for Part D and Workers' Compensation Medicare Set-Aside Arrangements". Medicare CMS Memoranda, published on Jul. 24, 2006 (6 pages).

"Medicare Secondary Payer—Workers' Compensation—Information". Medicare CMS Memoranda, published on May 20, 2008. (1 page).

"Statutory Language for the Medicare Secondary Payer Mandatory Reporting Provisions in Section 111 of the Medicare, Medicaid, and SCHIP Extension Act of 2007". Medicare CMS Memoranda, published on Jun. 11, 2008 (3 pages).

"Opportunity to Comment on CMS' Plans for Implementing the Medicare Secondary Payer Mandatory Reporting Provisions in Section 111 of the Medicare, Medicaid, and SCHIP Extension Act of 2007". Medicare CMS Memoranda, published on Jun. 15, 2008 (1 page).

"Collection of Social Security Nos. (SSNs), Medicare Health Insurance Claim Numbers (HICNs) and Employer Identification Nos. (EINs) (Tax Identification Numbers)—ALERT". Medicare CMS Memoranda, published on Jun. 23, 2008 (1 page).

"Supporting Statement for the MSP Mandatory Insurer Reporting Requirements of Section 111 of the Medicare, Medicaid, and SCHIP Extension Act of 2007". Medicare CMS Memoranda, published on Aug. 30, 2008 (20 pages).

"Medicare Secondary Payer—Workers' Compensation—Information". Medicare CMS Memoranda, published on Aug. 25, 2008 (3 pages).

"Implementation Timeline". Medicare CMS Memoranda, published on Sep. 5, 2008 (2 pages).

"Transitioning into Section 111 Reporting". Medicare CMS Memoranda, published on Sep. 17, 2008 (44 pages).

"Implementation of Medicare Secondary Payer Mandatory Reporting Provisions in Section 111 of the Medicare, Medicaid, and SCHIP Extension Act of 2007". Medicare CMS Memoranda, published on Sep. 22, 2008 (3 pages).

"Implementation of Medicare Secondary Payer Mandatory Reporting Provisions in Section 111 of the Medicare, Medicaid, and SCHIP Extension Act of 2007". Medicare CMS Memoranda, published on Oct. 10, 2008 (2 pages).

"Business Intelligence," Verisk Health, http://veriskhealth.com/content/view/319/489, p. 1. Estimated Publication Date: May 12, 2011.

"Claim Scoring," Disability Services, Claim Analytics, http://www.claimanalytics.com/scoring.html, pp. 1-5. Estimated Publication Date: May 12, 2011.

"Data Analysis and Predictive Modeling," ISO Government Solutions, http://www.isogov.com/services/data-management/predictive-modeling.html, p. 1. Estimated Publication Date: Jul. 5, 2008.

"Discover the Power of Predictive Analytics," ISO, www.iso.com/products/ISO-Risk-Analyzer-Auto-Discover-the-power-of-predictive-analytics.html, p. 1-2. Estimated Publication Date: Jan. 1, 2009.

"Key Features of CATT," Claim Assessment and Triage Technology, Axiomedics Research, Inc., http://www.axiomedics.com/catt.htm, p. 1. Estimated Publication Date: Jul. 10, 2010.

"Predictive Modeling and Scoring," ISO, http://www.iso.com/about-ISO/ISO-services-for-property-casualty-insurance/predictive-modeling-and-scoring.html, pp. 1-2. Estimated Publication Date: Dec. 31, 2008.

"Predictive Modeling," Claim Insight, http://www.claiminsights.com/predictive-modeling.php, p. 1. Estimated Publication Date: May 12, 2011.

"Workers' Compensation," Valen Technologies, http://www.valen.com/predictive-analytics/workers-compensation, p. 1. Estimated Publication Date: May 12, 2011.

Wayback Version of Non-Patent Literature Document C5. Estimated Publication Date: Nov. 15, 2009.

Wayback Version of Non-Patent Literature Document C14. Estimated Publication Date: Mar. 29, 2010.

* cited by examiner

SYSTEMS AND METHODS FOR TRACKING HEALTH-RELATED SPENDING FOR VALIDATION OF DISABILITY BENEFITS CLAIMS

RELATED APPLICATIONS

The present application claims priority to U.S. Provisional Patent Application Ser. No. 61/145,810, filed on Jan. 20, 2009, entitled "Methods and Systems for Tracking Health-related Spending for Validation of Disability Benefits Claims", which is incorporated herein in its entirety by reference.

FIELD OF THE INVENTION

The present disclosure relates to methods and systems for managing specifically authorized health-related spending through identifying, tracking and reporting technology and business methods. In particular, the present disclosure relates to methods and systems for electronically identifying, authorizing, tracking and reporting health-related spending for validation of medical benefits claims for compliance with 42 U.S.C. Section 1395y, et seq., Medicare's Secondary Payer Act.

BACKGROUND OF THE INVENTION

Conventionally, the Centers for Medicare and Medicaid Services (CMS) require funds in a Medicare Set Aside (MSA) account to be used exclusively for expenses related to its fiduciary interests, and require an annual report of expenditures. An estimated 95% MSA accounts are self-administered, placing responsibility on the claimant to properly use the funds and annually report to CMS. Non-compliance scenarios, in the event that a claimant does not properly use the funds or provide annual reports, may create serious CMS consequences for the claimant, including loss of future Medicare coverage until and unless Medicare is reimbursed for any monies misused in the MSA. When CMS discovers the non-compliance with the MSA terms and conditions and the claimant suffers the consequences of non-compliance, state law liability issues may arise for insurers, plaintiff firms, and other third party service providers that placed ungoverned funds totalling tens of thousands of dollars into the claimant's hands.

BRIEF SUMMARY OF THE INVENTION

In one aspect, a system provides for management of a financial services institution account containing insurance settlement funds, in compliance with Medicare's Secondary Payer Act. In one embodiment, insurance settlement funds are deposited with a bank card company that operates a computer executing software providing the functionality of the methods and systems described herein. In another embodiment, using an "Expense to PIN Identification System" (EPIS), an authorization server receives data stored on a bank card about the owner of the card, the service or good provided, and the provider of the service or good, which the authorization server uses to approve authorized disbursements and to prohibit unauthorized disbursements. In still another embodiment, the software includes a reporting component with which it provides an itemized accounting of the disbursements to the Center for Medicare and Medicaid Services (CMS), the client, and other identified parties.

In one aspect, a method for paying a healthcare-related expense via a card associated with a bank account funded by insurance benefits includes the step of receiving, by an authorization server, from a payment terminal, i) a request for authorization of a transfer, initiated by a recipient of insurance settlement funds, of at least a portion of the insurance settlement funds to a provider in payment for at least one of a healthcare-related service and a healthcare-related good, ii) an identifier of the provider, and iii) at least one of: a Current Procedural Terminology (CPT) code, an International Classification of Diseases (ICD) code, a Food and Drug Administration (FDA) drug identifier, a Healthcare Common Procedure Coding System (HCPCS), and an expense code recognized by the Centers for Medicare and Medicaid Services (CMS) associated with the at least one of the healthcare-related service and the healthcare-related good. The method includes determining, by the authorization server, whether the recipient is authorized to receive the at least one of the healthcare-related service and the healthcare-related good from the provider. The method includes determining whether the at least one of the CPT code, the ICD code, the FDA drug identifier, the HCPCS code, and the CMS expense code identifies at least one of a healthcare-related service and a healthcare-related good approved for purchase by the recipient. The method includes transmitting, by the authorization server, to the payment terminal, an approval of the transfer of the at least a portion of the insurance settlement funds, responsive to a determination that the at least one of the CPT code, ICD code, FDA code, the HCPCS code, and the CMS-recognized expense code identifies the at least one of the healthcare-related service and the healthcare-related good approved for purchase by the recipient and that the recipient is authorized to receive the at least one of the healthcare-related service and the healthcare-related good from the identified provider.

In another aspect, a method is provided for tracking any and all health-related spending for validation of benefits—including but not limited to, benefits related to medical treatments, prescriptions, diagnostics, durable medical equipment, services and items—by a Medicare Secondary Payer statute-compliance company (hereafter referred to as an MSPS-compliance company). An MSPS-compliance company may include an insurance carrier, a self-insurance company or carrier, a third-party administrator, an underwriter or any entity providing products or services for MSPS-compliance with respect to Medicare requirements. The method includes receiving, by a MSPS-compliance company, from an authorization server, an identification of an approved transaction initiated by a recipient of insurance settlement funds to acquire at least one of a healthcare-related service and a healthcare-related good by a provider, the recipient authorized to receive the at least one of the healthcare-related service and the healthcare-related good from the provider. The method includes tracking, by the Medicare Secondary Payer statute-compliance company, healthcare-related expenditures by the recipient. The method includes generating, by the Medicare Secondary Payer statute-compliance company a statement of approved transactions. The method includes transmitting, by the Medicare Secondary Payer statute-compliance company, to a disability benefit provider, the statement of approved transactions.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
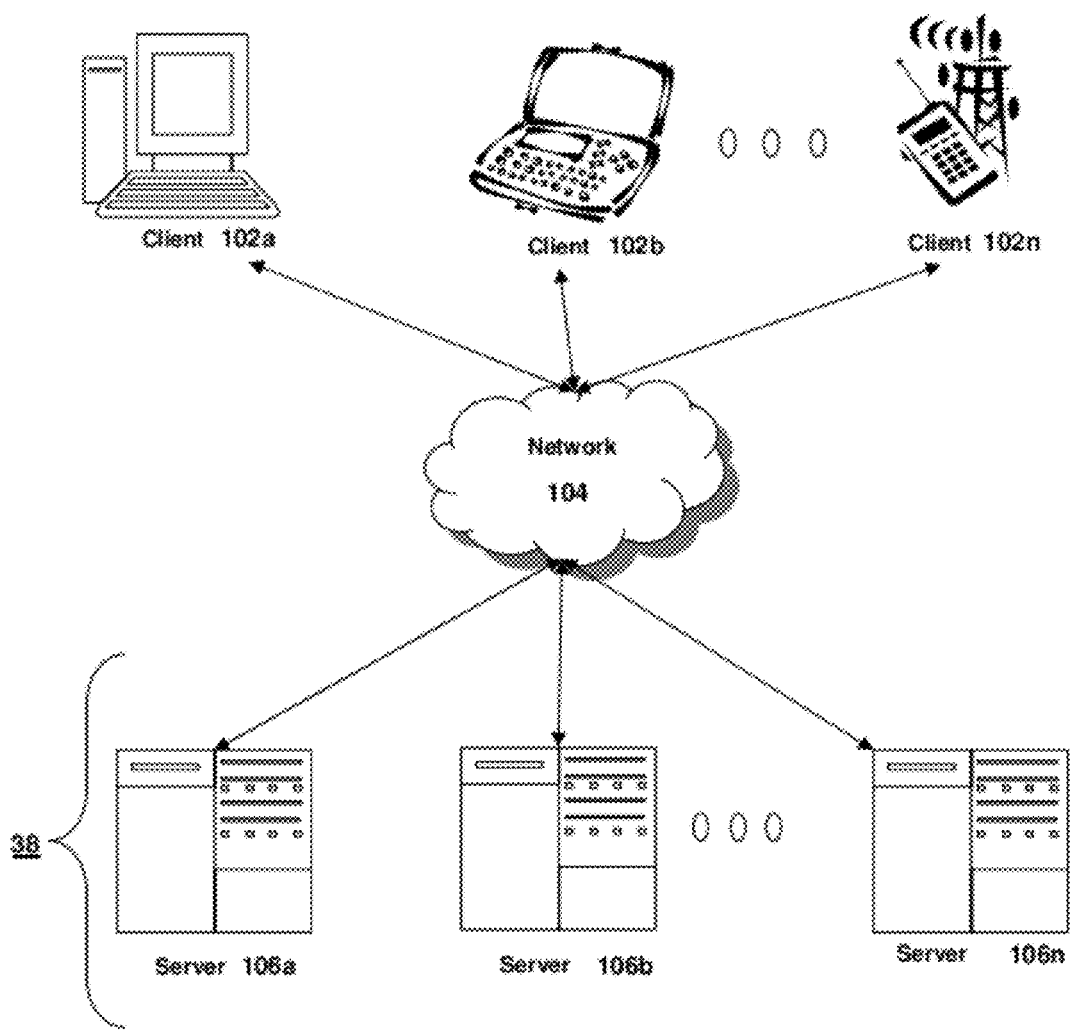
FIG. 1A is a block diagram depicting an embodiment of a network environment comprising local machines in communication with remote machines.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

The servers 106 may be geographically dispersed from each other or from the clients 102 and communicate over a network 104. The network 104 can be a local-area network (LAN), such as a company Intranet, a metropolitan area network (MAN), or a wide area network (WAN), such as the Internet or the World Wide Web. The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

A server 106 may be referred to as a file server, application server, web server, proxy server, or gateway server. In one embodiment, the server 106 provides functionality of a web server. In some embodiments, the web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the SUN JAVA web server products provided by Sun Microsystems, of Santa Clara, Calif., or the BEA WEBLOGIC products provided by BEA Systems, of Santa Clara, Calif.

The clients 102 may be referred to as client nodes, client machines, endpoint nodes, or endpoints. In some embodiments, a client 102 has the capacity to function as both a client node seeking access to resources provided by a server and as a server providing access to hosted resources for other clients 102a-102n. A client 102 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 102. The application can use any type of protocol and it can be, for example, an HTTP client, an FTP client, an Oscar client, or a Telnet client.

Figure 1B:
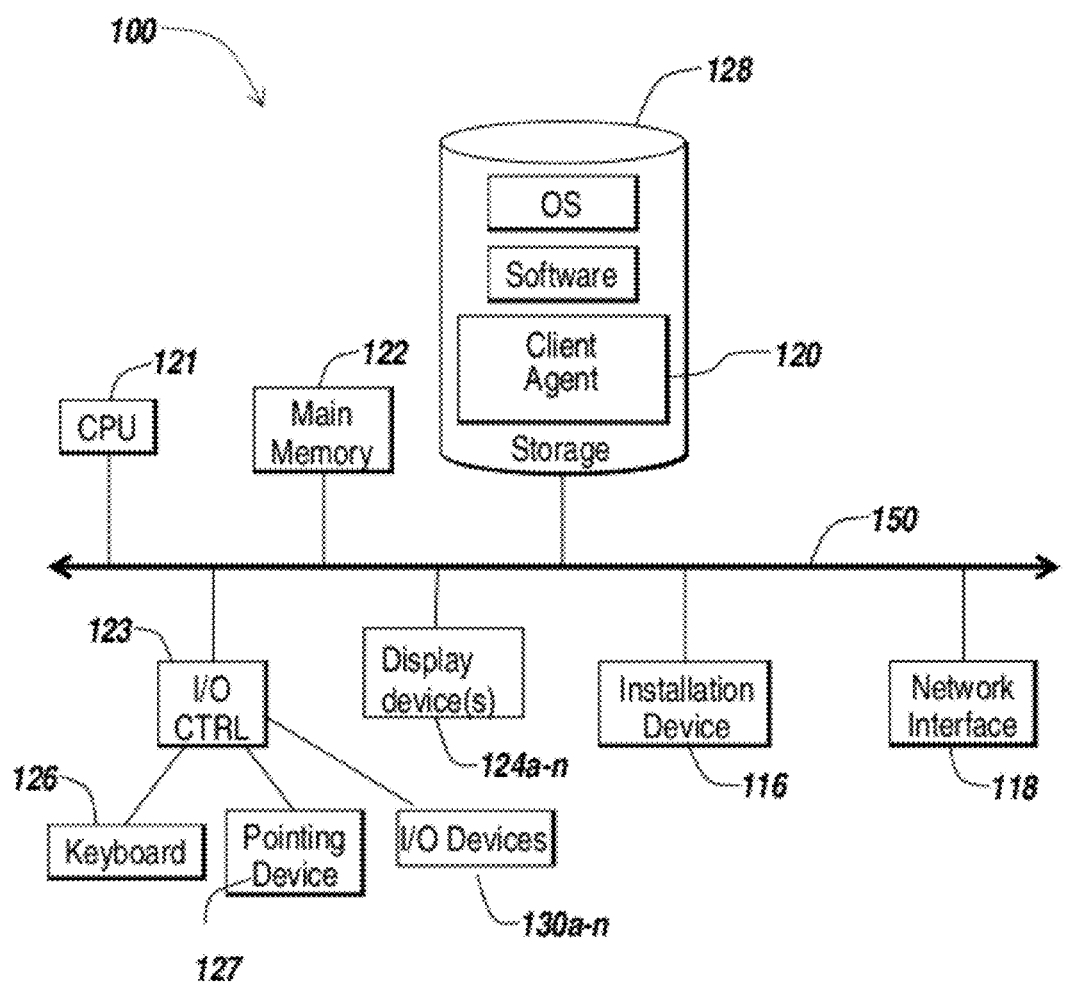
FIG. 1B is a block diagram depicting one embodiment of a computing device useful in connection with the methods and systems described herein.

The client 102 and server 106 may be deployed as and/or executed on any type and form of computing device, such as a computer, network device or appliance capable of communicating on any type and form of network and performing the operations described herein. FIG. 1B depicts a block diagram of a computing device 100 useful for practicing an embodiment of the client 102 or a server 106. As shown in FIG. 1B, each computing device 100 includes a central processing unit 121, and a main memory unit 122. As shown in FIG. 1B, a computing device 100 may include a visual display device 124, a keyboard 126 and/or a pointing device 127, such as a mouse.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client software, or portion thereof. The computing device 100 may further comprise a storage device 128, such as one or more hard disk drives or redundant arrays of independent disks, for storing an operating system and other related software, and for storing application software programs such as any program related to a client software package 120. Optionally, any of the installation devices 116 could also be used as the storage device 128. Additionally, the operating system and the software can be run from a bootable medium, for example, a bootable CD, such as KNOPPIX, a bootable CD for GNU/Linux that is available as a GNU/Linux distribution from knoppix.net.

The computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIG. 1B typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others. A server 106 and a client 102 may be heterogeneous, executing different operating systems.

In some embodiments, the computing device 100 may have different processors, operating systems, and input devices consistent with the device. For example, in one embodiment the computing device 100 is a TREO 180, 270, 1060, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computer system 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 comprises a combination of devices, such as a mobile phone combined with a digital audio player or portable media player. In one of these embodiments, the computing device 100 is one of a Motorola RAZR or Motorola ROKR line of combination digital audio players and mobile phones. In another of these embodiments, the computing device 100 is an iPhone smartphone, manufactured by Apple Computer of Cupertino, Calif.

Figure 2A:
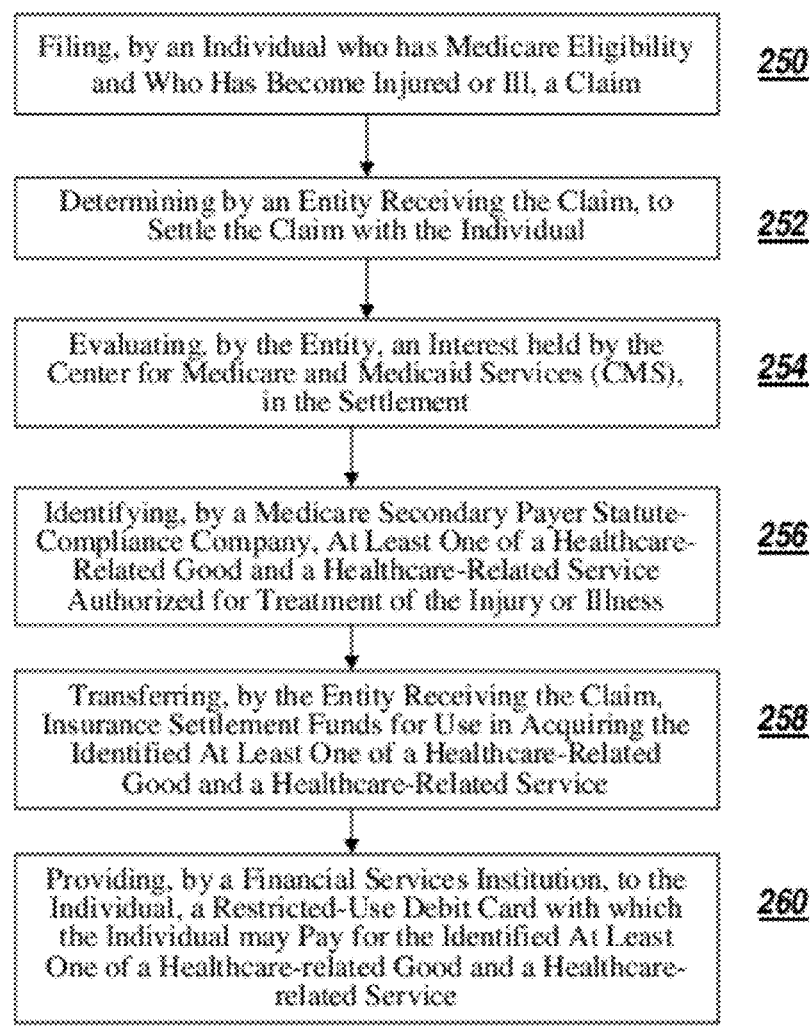
FIG. 2A is a flow diagram depicting one embodiment of a method for identifying at least one of an approved healthcare-related service, an approved healthcare-related good, and an approved healthcare provider for treatment of an injury or illness paid for by insurance settlement funds.

Referring now to FIG. 2A, a flow diagram depicts one embodiment of a method 200 for identifying at least one of an approved healthcare-related service, an approved healthcare-related good, and an approved healthcare provider for treatment of an injury or illness paid for by insurance settlement funds. In brief overview, the method includes filing, by an individual with Medicare eligibility who has become ill or injured, a claim with an insurer or other party (250). The method includes determining by an entity receiving the claim, to settle the claim with the individual (252). The method includes evaluating, by the entity, an interest held by the Center for Medicare and Medicaid Services (CMS), in the settlement (254). The method includes identifying, by a Medicare Secondary Payer statute-compliance company (an MSPS-compliance company), at least one of a healthcare-related good and a healthcare-related service authorized for treatment of the injury or illness (256). The method includes transferring, by the entity receiving the claim, insurance settlement funds for use in acquiring the identified at least one of a healthcare-related good and a healthcare-related service (258). The method includes providing, by the financial services institution, to the individual, a restricted-use bank card with which the individual may pay for the identified at least one of a healthcare-related good and a healthcare-related service (260).

Referring now to FIG. 2A, and in greater detail, an individual with Medicare eligibility who has become ill or injured files a claim with an insurer or other party (250). In one embodiment, a recipient of insurance settlement funds is an individual who has sustained an injury or illness and who makes a claim under a policy, such as an insurance policy, for funding to assist or completely cover the payment of medical services required to treat the injury or illness. In another embodiment, the recipient is referred to as a claimant.

In one embodiment, a recipient of insurance settlement funds is an individual who has sustained an injury or illness and who is or may be eligible to receive benefits from both an insurance provider and a second disability benefit provider, such as the Center for Medicare and Medicaid Services (CMS). In another embodiment, because of the type of injury sustained or the circumstances of the injury, CMS is a secondary provider from whom the individual receives benefits only if funds received from a primary insurer or benefit provider are insufficient. For example, in situations such as automobile accidents, or for individuals covered by workers' compensation, liability, or no-fault insurance, or for self-insured individuals, CMS may be a secondary payer. In some embodiments, the situations under which CMS is a secondary provider and the conditions under which the individual may receive benefits from CMS are defined by relevant statutes including, for example, 42 U.S.C. Section 1395y, et seq., past and future CMS policy regulations and all memoranda related to Medicare as a secondary payer.

The method includes determining, by an entity receiving the claim, to settle the claim with the individual (252). In one embodiment, an insurer—or other responsible party identified by the policy held by the recipient of the insurance settlement funds—decides to settle the claim, providing insurance settlement funds to the recipient. In some embodiments, an insurance provider determines that the individual is eligible for benefits from CMS prior to settlement. In one of these embodiments, when preparing to settle the claim, the entity providing insurance (such as an insurer or self insurer, insurance company, or a third-party associated with the policy), makes a determination regarding the individual's Medicare status, and regarding consideration of Medicare's secondary payer position. In another of these embodiments, an MSPS-compliance company makes the determination regarding the individual's status.

The method includes evaluating, by the entity, an interest held by the Center for Medicare and Medicaid Services (CMS), in the settlement (254). In one embodiment, the insurer—or other responsible party identified by the policy held by the recipient of the insurance settlement funds—evaluates whether CMS has or may have an interest in the claim or the insurance settlement funds according to a statute such as the Medicare Secondary Payer Act. In another embodiment, an MSPS-compliance company performs the evaluation.

In some embodiments, consideration of Medicare's interests is addressed in a Jul. 23, 2001, CMS Memorandum entitled "Workers' Compensation: Commutation of Future Benefits", as "the use of administrative mechanisms sometimes referred to by attorneys as Medicare Set Aside Trusts". In one of these embodiments, these trusts enable Medicare to identify situations that would otherwise go unnoticed, which in turn prevents Medicare from making mistaken payments. In other embodiments, consideration of Medicare's interest can be defined as identifying and setting aside in an interest bearing account, those expenses whereby Medicare, if it were the primary insurer, would ordinarily pay. In one of these embodiments, an MSPS-compliance company determines the amount of those expenses; for example, by using skilled medical professionals who are experienced in evaluating past medical treatments and histories, are knowledgeable of current Medicare covered expenses, and are trained to recognize and segregate those expenses from those that are not related to the settlement and not covered by Medicare's current insurance. In another of these embodiments, the medical professionals construct a realistic estimate of future Medicare-covered expenses for the claimant, intended to protect Medicare's secondary payer position in the settlement. In further embodiments, in considering Medicare's interests, medical and legal professionals evaluate CMS memoranda including, but not limited to, the following:

Oct. 10, 2008—Implementation of Medicare Secondary Payer Mandatory Reporting Provisions in Section 111 of the Medicare, Medicaid, and SCHIP Extension Act of 2007
  Sep. 22, 2008—Employer Size vs. Covered Lives and Small Employer Exception for Group Health Plans
  Sep. 18, 2008—Transition into Section 111 reporting for Group Health Plans
  Sep. 5, 2008—Implementation Timeline
  Aug. 25, 2008 "Medicare Secondary Payer—Workers' Compensation—INFORMATION"
  Aug. 1, 2008 "Supporting Statement for the MSP Mandatory Insurer Reporting Requirements of Section 111 of the Medicare, Medicaid, and SCHIP Extension Act of 2007"

Jun. 23, 2008 Collection of Social Security Numbers (SSNs), Medicare Health Insurance Claim Numbers (HICNs) and Employer Identification Numbers (EINs) (Tax Identification Numbers)—ALERT Jun. 15, 2008 Opportunity to Comment on CMS' Plans for Implementing the Medicare Secondary Payer Mandatory Reporting Provisions in Section 111 of the Medicare, Medicaid, and SCHIP Extension Act of 2007 (See 42 U.S.C. 1395y(b)(7)&(b)(8))

Jun. 11, 2008 Statutory Language for the Medicare Secondary Payer Mandatory Reporting Provisions in Section 111 of the Medicare, Medicaid, and SCHIP Extension Act of 2007 (See 42 U.S.C. 1395y(b)(7)&(b)(8))

May 20, 2008 Medicare Secondary Payer—Workers' Compensation—INFORMATION

Jul. 24, 2006—"Questions and Answers for Part D and Workers' Compensation Medicare Set-Aside Arrangements"

Apr. 25, 2006—"Workers' Compensation Medicare Set-Asides and Revision of the Low Dollar Threshold for Medicare Beneficiaries."

Dec. 30, 2005—"Workers' Compensation Medicare Set-Aside Arrangements Questions and Answers"

Jul. 11, 2005—"Medicare Secondary Payer—Workers' Compensation Additional Frequently Asked Questions"

Oct. 15, 2004—"Medicare Secondary Payer—Workers' Compensation Additional Frequently Asked Questions"

May 7, 2004—"Medicare Secondary Payer—Workers' Compensation Information"

May 23, 2003—"Medicare Secondary Payer—Workers' Compensation Additional Frequently Asked Questions"

Apr. 22, 2003—"Medicare Secondary Payer—Workers' Compensation Frequently Asked Questions"

Jul. 23, 2001—The "Patel Memo"—"Workers' Compensation: Commutation of Future Benefits"

In one embodiment, employees of an MSPS-compliance company—for example, attorneys employed by the company—review a completed assessment of a claim, and consider the past, present and future liabilities in which Medicare might have an interest. In another embodiment, this includes drafting legal opinions to accompany MSA reports, handling zero allocations, negotiating with CMS regarding acceptance issues, and generally supervising the overall process. In some embodiments, the evaluation includes determination and resolution of any conditional payments that may have been paid. In other embodiments, the evaluation includes an evaluation and estimate of the individual's future medical treatments and expenses that Medicare would ordinarily be responsible for if not for the primary insurance carrier's obligations.

The method includes identifying, by a Medicare Secondary Payer statute-compliance company (an MSPS-compliance company), at least one of a healthcare-related good and a healthcare-related service authorized for treatment of the injury or illness (256). In some embodiments, the MSPS-compliance company determines a portion of the future medical care to be set aside to address Medicare's Secondary Payer interests. In one of these embodiments, this determination is the result of analyses by medical and legal professionals who review the claim, determine an amount and type of medical care and associated expenses that should protect Medicare's interest, estimate the expense of this care and prepare a detailed listing of specific services, prescriptions, products and expenses that the recipient of the insurance settlement funds is authorized to pay for with the insurance settlement funds. In yet another of these embodiments, the determination is a result of an application of an algorithm or other automated process for determining the quantity of funding to set aside; this application may occur alone or in parallel with a determination by the medical and legal professionals.

In some embodiments, the MSPS-compliance company creates a Medicare Set Aside (MSA) account as a result of the evaluation of the interest held by CMS in the settlement. In one of these embodiments, the MSPS-compliance company processes data associated with the claimant, including, without limitation, the individual's personal data (such as name, residential information, social security number, or date of birth), an identification of a type of impairment suffered by the individual, a level of education of the individual, occupation, disability data (including date of disability and ICD code), a history of benefits claimed previously, identifications of impairments, symptoms, physical and/or mental limitations, side effects of medications, medical history, methods of treatment, and past relevant work history, if any. In another of these embodiments, the MSPS-compliance company analyzes previous treatments, diagnostics, and prescriptions associated with the individuals. In still another of these embodiments, the MSPS-compliance company identifies relevant treatments and services for addressing present injuries or illnesses and projected future treatments. In yet another of these embodiments, an identification of approved treatments and services is generated and associated with the MSA account.

In one embodiment, the MSPS-compliance company identifies an amount of money to be paid in a settlement responsive to the evaluation of the interest held by CMS in the settlement. In another embodiment, the MSPS-compliance company identifies the amount of money to be paid in the settlement responsive to the identification of the at least one of the healthcare-related good and the healthcare-related service authorized for treatment of the injury or illness. In some embodiments, the insurance settlement funds represent at least a portion of a settlement of an insurance claim resulting from the filing of a claim by an individual who was injured or became ill. In one of these embodiments, the insurance settlement funds refer to funds transferred to the recipient that are set aside in order to consider and protect Medicare's interest in the settlement.

The method includes transferring, by the entity receiving the claim, insurance settlement funds for use in acquiring the identified at least one of a healthcare-related good and a healthcare-related service (258). In one embodiment, a financial services institution identified by a recipient of insurance settlement funds receives, from an insurance company, self insurance company, third-party administrator or other party associated with the recipient, at least a portion of the insurance settlement funds for deposit in a restricted account. In another embodiment, the financial services institution identified by a recipient of insurance settlement funds receives the funds directly or indirectly, such as via a transfer from a law firm escrow account. In still another embodiment, at settlement, the monies to protect Medicare's secondary payer position are set aside into an interest bearing account in a financial services institution to be disbursed only for those identified expenses in the set aside fund. Financial services institutions may include banks, credit unions, or other financial services entities.

The method includes providing, by the financial services institution, to the individual, a restricted-use bank card with which the individual may pay for the identified at least one of a healthcare-related good and a healthcare-related service (260). In one embodiment, the financial services institution provides a bank card to the recipient, the bank card approved for use in paying for at least one of an approved healthcare-related service and an approved healthcare-related good when provided by an approved provider. In another embodiment, use of the restricted-use bank card results in the transfer of funds from an account storing the insurance settlement funds to a provider of a healthcare-related good or service. In another embodiment, the account is owned exclusively by the recipient of insurance settlement funds as opposed to, for example, being a joint account or a custodial account accessible by both the recipient and the insurance company. In still another embodiment, the financial services institution provides the restricted-use bank card directly to the individual. In yet another embodiment, the financial services institution provides the restricted-use bank card to the MSPS-compliance company, which provides the restrict-use bank card to the individual; for example, the individual may receive the card at the time of settlement with documentation relating to the use of the card, relevant code numbers for requesting payment of goods and services with the card, or documentation relating to an MSA account.

In some embodiments, the financial services institution associates the restricted-use bank card with an existing account. In other embodiments, the financial services institution generates a new account for the individual and associates the restricted-use bank card with the new account. In still other embodiments, while the account may be referred to as a "bank account", it should be understood that the account may be any type of account provided by a financial services institution, including banks, credit unions, or other financial services entities. In further embodiments, while the restricted-use card may be referred to as a "bank card", it should be understood that the card may be any of a credit card, a debit card, a charge card, a check card or any other card that enables the holder to have an amount of money—such as, for example, the amount of money needed to pay for a purchased good or service—charged to an account associated with the holder.

Figure 2B:
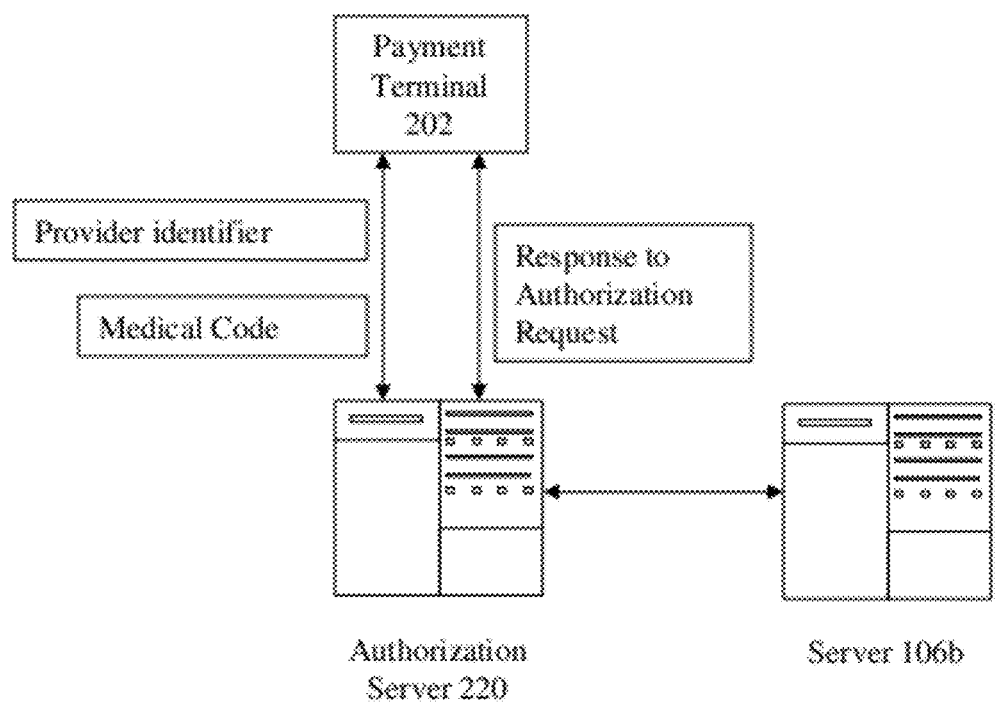
FIG. 2B is a block diagram depicting one embodiment of a system for tracking health-related spending for validation of disability benefits claims.

Referring now to FIG. 2B, a block diagram depicts one embodiment of a system for paying a healthcare-related expense via a card associated with a bank account funded by insurance benefits. In brief overview, the system includes an authorization server 220 and a payment terminal 202. The authorization server 220 receives, from the payment terminal 202, i) a request for authorization of a transfer, initiated by a recipient of insurance settlement funds, of at least a portion of the insurance settlement funds to a provider in payment for at least one of a healthcare-related service and a healthcare-related good, ii) an identifier of the provider, iii) at least one of a Current Procedural Terminology (CPT) code, an International Classification of Diseases (ICD) code, a Food and Drug Administration (FDA) drug identifier, a Healthcare Common Procedure Coding System (HCPCS) code, and an expense code recognized by the Centers for Medicare and Medicaid Services (CMS) associated with the at least one of the healthcare-related service and the healthcare-related good. The authorization server 220 determines whether the recipient is authorized to receive the at least one of the healthcare-related service and the healthcare-related good from the identified provider. The authorization server 220 determines whether the at least one of the CPT code, the ICD code, the FDA drug identifier, the HCPCS code, and the CMS-recognized expense code identifies at least one of a healthcare-related service and a healthcare-related good approved for purchase by the recipient. The authorization server 220 transmits, to the payment terminal 202, an approval of the transfer of the at least a portion of the insurance settlement funds, responsive to a determination that the at least one of the CPT code, the ICD code, the FDA drug identifier, the HCPCS code and the CMS-recognized expense codes identifies at least one of the healthcare-related service and the healthcare-related good approved for purchase by the recipient and that the recipient is authorized to receive the at least one of the healthcare-related service and the healthcare-related good from the identified provider.

Referring now to FIG. 2B, and in greater detail, the authorization server 220 receives, from the payment terminal 202, a request for authorization of a transfer, initiated by a recipient of insurance settlement funds, of at least a portion of the insurance settlement funds to a provider in payment for at least one of the healthcare-related service and the healthcare-related good, and information associated with the provider and the at least one of the healthcare-related service and the healthcare-related good. In one embodiment, the authorization server 220 is a server 106a as described above in connection with FIGS. 1A-1B. In another embodiment, the authorization server 220 includes a transceiver for communicating with the payment terminal 202. In still another embodiment, the authorization server 220 includes software for determining whether to authorize the transfer.

In some embodiments, the authorization server 220 is operated by a bank holding the insurance settlement funds on behalf of the recipient in an account controlled by the recipient. In one of these embodiments, the authorization server 220 executes software provided to the bank by a third-party vendor. In other embodiments, the authorization server 220 is in communication with a server 106b; for example, the authorization server 220 may communicate with a third party server, such as a server associated with an MSPS-compliance company.

In one embodiment, a provider is a doctor, nurse, pathologist, radiologist, neurologist, health care provider, health professional, or other medical professional delivering health care to patients. In another embodiment, a provider is an employee at a pharmacy or other company selling prescription drugs. In still another embodiment, a healthcare-related service includes, without limitation, a meeting with at least one physician, inpatient care in hospitals, outpatient care, doctors' services, laboratory tests, x-ray services, orthodontic services, mental health treatments, physical and occupational therapists, and other services. In still even another embodiment, a healthcare-related good includes, without limitation, eye glasses, durable medical equipment (such as wheelchairs and braces), prescription drugs, modified vans, improvements to living facilities, and guide dogs. In yet another embodiment, at least one of a healthcare-related service and a healthcare-related good includes, without limitation, any good or service covered by benefits plans provided by the Centers for Medicare and Medicaid Services at either the federal or state level.

In one embodiment, the payment terminal 202 is a device that allows an individual charging a fee for a good or service to process a bank card for payment of the good or service. In another embodiment, the payment terminal 202 extracts account data from a bank card and transmits the data to an account manager—such as a bank holding an account associated with the bank card for the benefit of a customer—for approval of a transfer of funds; for example, and without limitation, the payment terminal 202 may extract data from a magnetic stripe on a bank card or from a radio frequency identification transponder embedded in the bank card and transmit the extracted data to a bank issuing the bank card with a request for approval of a payment request on behalf of a bank customer holding the bank card. In still another embodiment, the payment terminal 202 is a virtual device provided by a software program that receives bank card information—such as an account number—from a user and transmits the received information to the account manager.

In some embodiments, the payment terminal 202 is a computing device 100 as described above in connection with FIGS. 1A-1B. In other embodiments, the payment terminal 202 is a software program executing on a computing device 100. In still other embodiments, the payment terminal 202 resides at a point of sale and communicates with the authorization server 220 over a network 104. In yet other embodiments, the payment terminal 202 is a point of sale device. In further embodiments, the payment terminal 202 is a web-based point of sale device that may be controlled via internet-based communications protocols such as those described above in connection with FIGS. 1A-1B.

In one embodiment, the payment terminal 202 is a PD4750 or PD8750 Payment Terminal manufactured by Motorola, Inc. In another embodiment, the payment terminal 202 is a Vx510, Vx570, or VX610 terminal manufactured by Verifone, Inc. In still another embodiment, the payment terminal 202 is a device complying with the Unified Point of Service architectural specification. In yet another embodiment, the payment terminal 202 is a device complying with the Java Point of Service (JavaPOS) architectural specification, developed by Sun Microsystems, Inc., International Business Machines, Corp., and NCR Corporation.

In some embodiments, the payment terminal 202 includes a credit authorization terminal (CAT) device. In one of these embodiments the payment terminal 202 includes a display, keyboard, magnetic stripe card reader, receipt printing device, and a communications device. In another of these embodiments, the payment terminal 202 manages encryption and communication with approval agencies for electronic funds transfer operations.

Figure 2C:
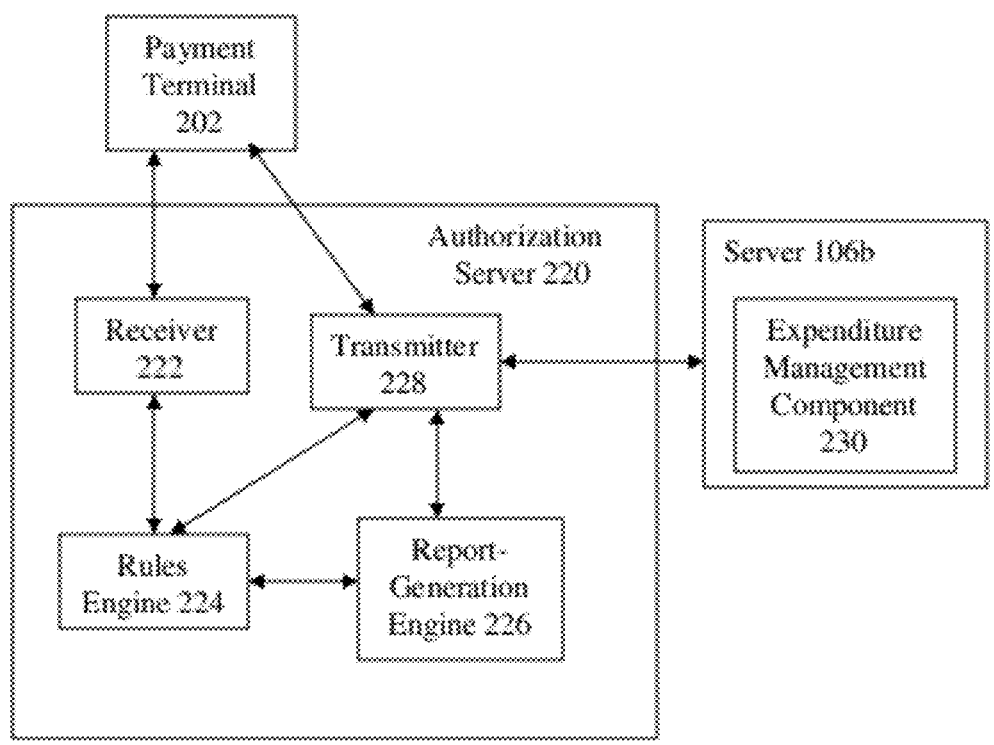
FIG. 2C is a block diagram depicting one embodiment of an authorization server in a system for tracking health-related spending for validation of disability benefits claims.

Referring now to FIG. 2C, a block diagram depicts one embodiment of an authorization server in a system for paying a healthcare-related expense via a card associated with a bank account funded by insurance benefits. In one embodiment, the authorization server 220 includes a receiver 222, a rules engine 224, a report-generation engine 226, and a transmitter 228. In another embodiment, the authorization server 220 is in communication with a payment terminal 202; for example, the authorization server 220 may communicate with a payment terminal 202 located at a point of sale for a health-related good or service. In some embodiments, a single component provides the functionality of the receiver 222 and the transmitter 228. In other embodiments, the authorization server communicates with the payment terminal 202 and the server 106b over a network 104 as described above in connection with FIGS. 1A-C.

Referring now to FIG. 2C, and in greater detail, in some embodiments, the authorization server 220 executes one or more software programs providing the functionality of at least one of the receiver 222, the rules engine 224, the report-generation engine 226, and the transmitter 228. In other embodiments, the authorization server 220 includes a hardware component providing the functionality of at least one of the receiver 222, the rules engine 224, the report-generation engine 226, and the transmitter 228. In still other embodiments, the authorization server 220 is provided as software executing on a server 106a.

In some embodiments, the rules engine 224 includes functionality for receiving request-related information (such as identifiers of goods, services, or providers) and determining whether to approve a request. In one embodiment, the rules engine 224 accesses at least one database to identify a cardholder associated with a request. In another embodiment, the rules engine 224 includes functionality for approving or rejecting a request for an expense. In still another embodiment, the rules engine 224 accesses at least one database to determine whether an identified account stores sufficient funding to pay for a requested expense. In still even another embodiment, the rules engine 224 is in communication with a report-generation engine 226 and transmits an identification of a determination of whether to approve or deny a request. In yet another embodiment, the rules engine 224 is in communication with a transmitter 228 and transmits an identification of a determination of whether to approve or deny a request for forwarding to the payment terminal 292.

In other embodiments, the report-generation engine 226 transmits, directly or indirectly, to a server 106 maintained by the MSPS-compliance company an identification of an authorization determination by the authorization server 220. In one of these embodiments, the report-generation engine 226 generates a report satisfying the annual reporting requirements of the CMS MSP statutes. In another of these embodiments, the report-generation engine 226 transmits a copy of the report to the recipient of the insurance settlement funds.

In some embodiments, the authorization server 220 includes voice recognition software and auto attendant capabilities. In one of these embodiments, the authorization server provides functionality allowing claimants and providers to call a telephone number to validate treatments and prescriptions. In another of these embodiments, the caller will be prompted to provide an assigned claim number for a specific claimant. In still another of these embodiments, after authorization, the caller is prompted to indicate whether the call relates to requests for payment of treatments or of prescriptions (for example, by pressing one key on a telephone keypad for the former and a second key for the latter). In still even another of these embodiments, the caller enters at least one of a CPT code, an ICD code, an FDA drug identifier, an HCPCS code, and a CMS-recognized expense code to identify a particular treatment or prescription. In yet another of these embodiments, the received information is transmitted to a component, such as the rules engine 224, for approval or rejection.

In some embodiments, the authorization server 220 is in communication with a server 106b. In one of these embodiments, the authorization server 220 communicates with a server 106b maintained by the MSPS-compliance company. In another of these embodiments, the authorization server 220 and the server 106b reside on different networks 104, 104'. In still another of these embodiments, the authorization server 220 and the server 106b reside on the same network 104. In other embodiments, a single entity maintains the authorization server 220 and the server 106b, as opposed to a bank maintaining the authorization server 220 while a separate entity maintains the server 106b.

In one embodiment, the server 106b includes an expenditure management component 230. In another embodiment, the expenditure management component 230 includes a receiver receiving from the authorization server 220 an identification of an approved transaction initiated by the recipient to acquire at least one of a healthcare-related service and a healthcare-related good by a provider, the recipient authorized to receive the at least one of the healthcare-related service and the healthcare-related good from the provider. In still another embodiment, the expenditure management component 230 provides a user interface for tracking healthcare-related expenditures by the recipient. For example, the expenditure management component 230 may execute a software program generating and displaying a graphical user interface allowing an administrator to view a plurality of requested expenditures and a plurality of accompanying determinations by the authorization server 220 regarding whether to approve or deny each of the plurality of requested expenditures. In yet another embodiment, the expenditure management component 230 includes functionality for generating statistical data regarding at least one recipient of insurance settlement funds; for example, the functionality may summarize a level of risk of liability created by a recipient. In some embodiments, the expenditure management component 230 includes functionality for determining treatment and expense actuarial behaviors by various age, sex, injury or illness categories, occupation categories, actual fund expenditures compared to forecasted, and any other analytics resulting from the card activity that can possibly be extracted. In other embodiments, the expenditure management component 230 includes a report-generation component that generates a statement of approved transactions. In other embodiments, the expenditure management component 230 transmits, to at least one CMS computer 100, an identification of at least one approved transaction. In further embodiments, user authorization or authentication is performed prior to execution of functionality provided by the expenditure management component 230.

In some embodiments, the expenditure management component 230 transmits, to the authentication server 220, new and modified data associated with authorized claimant treatments and prescriptions data. In one of these embodiments, the expenditure management component 230 includes functionality for establishing a secure connection to the authentication server 220 and transmitting the data via the secure connection. In another of these embodiments, the transmitted data includes an identification of how many treatments or prescriptions remain available to the claimant; for example, the data may indicate that a claimant has a certain number of refills available on an authorized prescription. In still another of these embodiments, communication to and storage of data on the storage element is secured; for example, the expenditure management component 230 may encrypt data prior to transmission.

In other embodiments, the expenditure management component 230 transmits, to a storage element such as a database, new and modified data associated with authorized claimant treatments and prescriptions data. In one of these embodiments, for example, modified data may indicate that a claimant has acquired a certain treatment or prescription, reducing an amount of remaining treatments or prescriptions available. In further embodiments, communication to and storage of data on the storage element is secured; for example, the expenditure management component 230 may encrypt data prior to transmission.

Although only one payment terminal 202, authorization server 220, and server 106*b* are depicted in the embodiment shown in FIGS. 2B and 2C, and only one receiver 222, rules engine 224, report-generation engine 226, and transmitter 228 are depicted in FIG. 2B, it should be understood that the system may provide multiple ones of any or each of those components.

Figure 3:
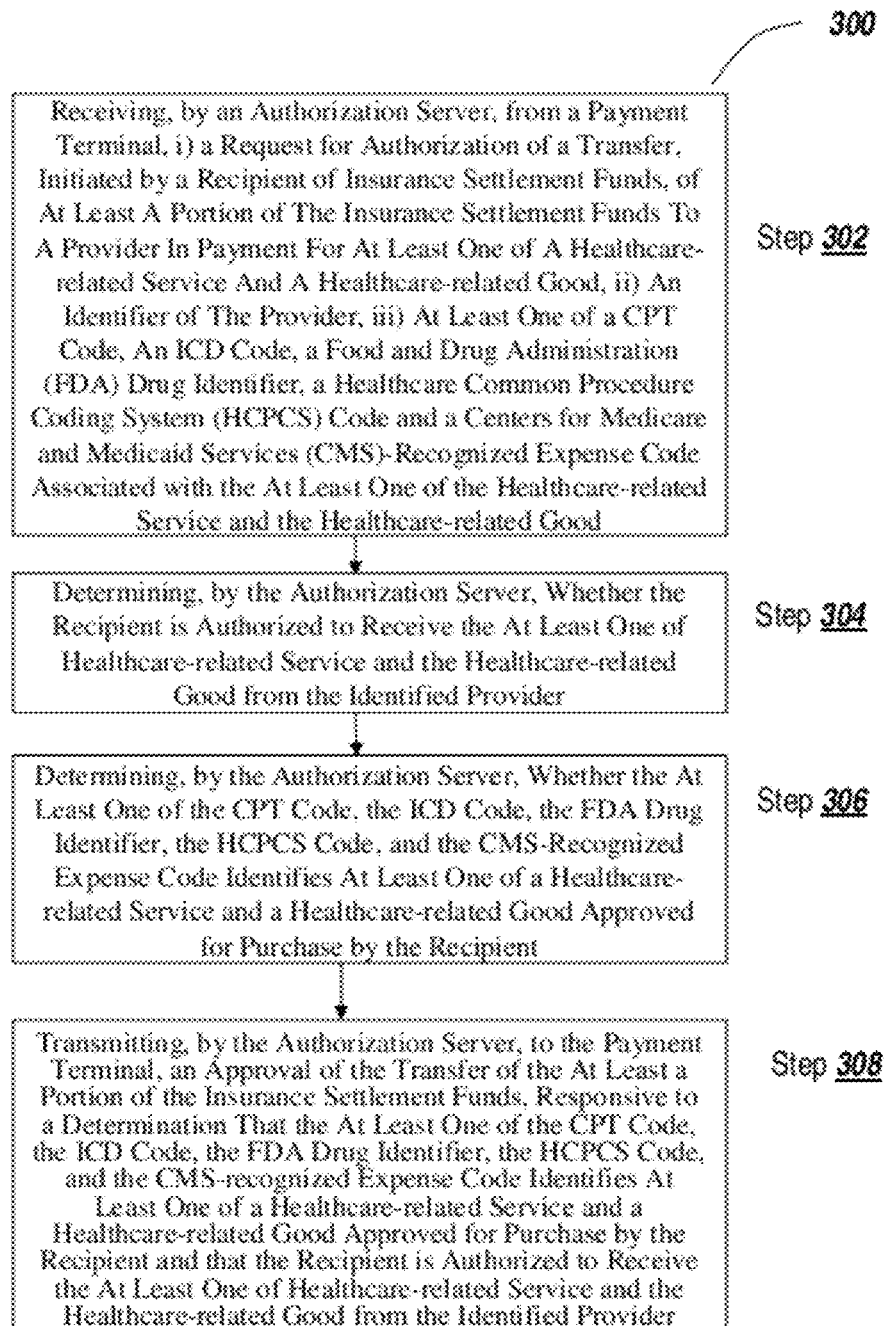
FIG. 3 is a flow diagram depicting one embodiment of a method for paying a healthcare-related expense via a card associated with a bank account funded by insurance benefits.

Referring now to FIG. 3, a flow diagram depicts one embodiment of the steps taken in a method 300 for paying a healthcare-related expense via a card associated with a bank account funded by insurance benefits. In brief overview, the method includes the step of receiving, by an authorization server, from a payment terminal, i) a request for authorization of a transfer, initiated by a recipient of insurance settlement funds, of at least a portion of the insurance settlement funds to a provider in payment for at least one of a healthcare-related service and a healthcare-related good, ii) an identifier of the provider, iii) at least one of a Current Procedural Terminology (CPT) code, an International Classification of Diseases (ICD) code, a Food and Drug Administration (FDA) drug identifier, a Healthcare Common Procedure Coding System (HCPCS) code, and an expense code recognized by the Centers for Medicare and Medicaid Services (CMS) associated with the at least one of the healthcare-related service and the healthcare-related good (302). The method includes the step of determining, by the authorization server, whether the recipient is authorized to receive the at least one of the healthcare-related service and the healthcare-related good from the identified provider (304). The method includes the step of determining, by the authorization server, whether the at least one of the CPT code, the ICD code, the FDA drug identifier, the HCPCS code, and the CMS-recognized expense code identifies at least one of the healthcare-related service and the healthcare-related good approved for purchase by the recipient (306). The method includes the step of transmitting, by the authorization server, to the payment terminal, an approval of the transfer of the at least a portion of the insurance settlement funds, responsive to a determination that the at least one of the CPT code, the ICD code, the FDA drug identifier, and the HCPCS code, and the CMS-recognized expense code identifies at least one of a healthcare-related service and a healthcare-related good approved for purchase by the recipient and that the recipient is authorized to receive the at least one of the healthcare-related service and the healthcare-related good from the identified provider (308).

Referring now to FIG. 3, and in greater detail, an authorization server receives, from a payment terminal, i) a request for authorization of a transfer, initiated by a recipient of insurance settlement funds, of at least a portion of the insurance settlement funds to a provider in payment for at least one of a healthcare-related service and a healthcare-related good, ii) an identifier of the provider, iii) at least one of a CPT code, an ICD code, a Food and Drug Administration (FDA) drug identifier, a Healthcare Common Procedure Coding System (HCPCS) code, and an expense code recognized by the Centers for Medicare and Medicaid Services (CMS) associated with the at least one of the healthcare-related service and the healthcare-related good (302). In one embodiment, the authorization server 220 receives, from the payment terminal 202, a request for authorization of a transfer, initiated by a recipient of insurance settlement funds, of at least a portion of the insurance settlement funds to a provider in payment for at least one of a healthcare-related service and a healthcare-related good. In another embodiment, the recipient uses a bank card in the payment terminal 202 to initiate the request for authorization of the transfer.

In one embodiment, the recipient enters an identification of the provider; for example, the user may select a doctor or pharmacy upon receiving a prompt for the identification from the payment terminal 202. In another embodiment, a user— such as a pharmacy employee—enters the identifier of the provider on behalf of the recipient. In still another embodiment, the payment terminal 202 has access to the identifier of the provider and transmits the identifier of the provider to the authorization server 220; for example, the payment terminal 202 may be preprogrammed with the identifier of the provider or the payment terminal 202 may retrieve the identifier of the provider from a storage element, such as a database.

In one embodiment, the authorization server 220 receives, from the payment terminal 202, at least one of a Current Procedural Terminology (CPT) code, an International Classification of Diseases (ICD) code, a Food and Drug Administration (FDA) drug identifier, a Healthcare Common Procedure Coding System (HCPCS) code, and an expense code recognized by the Centers for Medicare and Medicaid Services (CMS) associated with the at least one of the healthcare-related service and the healthcare-related good. In one embodiment, a CPT code is a five digit numeric code used to describe medical, surgical, radiology, laboratory, anesthesiology, and evaluation/management services of physicians, hospitals, and other health care providers. In another embodiment, a CPT code is a code published by the American Medical Association to provide uniform language that accurately describes medical, surgical, and diagnostic services. In still another embodiment, CPT codes are grouped by services including, without limitation, evaluation and management codes; anesthesia services; surgical procedures; radiology procedures; laboratory procedures; medical procedures; and new technology. In some embodiments, received codes include APC (Ambulatory Payment Classification) codes, which directly correspond to CPT codes and are used by some workers compensation plans.

In one embodiment, the ICD code is part of an official coding system used to assign diagnoses codes for all healthcare providers in a country; for example, the official coding system may be that specified by the International Classification of Diseases, 9th Revision, Clinical Modification code and may be referred to as an ICD-9 code. In another embodiment, software is provided that compares the codes for a logical relationship; for example, to ensure that an identified procedure logically applies to a classified disease or symptom.

In some embodiments, an FDA drug identifier is a unique ingredient identifier (UNII) identifying at least one substance in drugs, biologics, foods, and devices based on molecular structure and/or descriptive information. In other embodiments, an FDA code is referred to as a national drug code (NDC). In still other embodiments, received codes include HCPCS codes, which are codes maintained by CMS for non-physician services describing durable medical equipment (DME), drugs, ambulance services, implants and supplies. In further embodiments, received codes referred to herein as CMS-recognized expense codes include any procedural code recognized by CMS.

In some embodiments, the recipient enters the at least one of the CPT code, the ICD code, the FDA drug identifier, the HCPCS code, and the CMS-recognized expense code, for example, the user may enter the at least one of the CPT code, the ICD code, the FDA drug identifier, the HCPCS code, and the CMS-recognized expense code upon receiving a prompt from the payment terminal 202. In other embodiments, the recipient the at least one of the CPT code, the ICD code, the FDA drug identifier, the HCPCS code, and the CMS-recognized expense code upon receiving a request for a personal identification number (PIN) from the payment terminal 202. In one of these embodiments, for example, the recipient may have received an enumeration of codes and identifiers with the bank card at the time of disbursement of the insurance settlement funds. In another of these embodiments, when the recipient receives, from a healthcare provider, a request to pay for a healthcare-related good or service, the recipient provides the bank card for payment at a conventional payment terminal and instead of entering a personal identification number, the recipient enters one of the enumerated codes and identifiers. In other embodiments, a user—such as a pharmacy employee—enters the at least one of the CPT code, the ICD code, the FDA drug identifier, the HCPCS code, and the CMS-recognized expense code on behalf of the recipient.

In one embodiment, by entering a medical code—such as the at least one of the CPT code, the ICD code, the FDA drug identifier, the HCPCS code, and the CMS-recognized expense code—in place of a PIN, the system leverages the use of standard payment terminals that include the ability to extract data from a card and to request an identification number in order to retrieve information about both the recipient making the request and the particular good or service requested by the recipient. In another embodiment, such a system uses the medical code to provide both identification of the requested good or service and as part of an authorization process. In still another embodiment, replacing the PIN with the medical code (instead of, for example, requiring both a PIN and the code) improves usability of the system since many individuals have experience in entering PINs for banking or authorization purposes and leveraging that experience may minimize any learning curves for first-time users. In yet another embodiment, such a system may be referred to as an "Expense to PIN Identification System."

In some embodiments, additional information is transmitted to the authorization server. In one of these embodiments, a provider, or provider's employee, scans a barcode associated with, attached to, or embedded on the requested healthcare-related good or service; for example, the provider may scan the barcode as part of a standard process of identifying a price and initiating a request for payment for the good or service. In another of these embodiments, the scanned barcode data is associated with an identification of the good or service and of an associated fee. In still another of these embodiments, the fee is transmitted to the payment terminal 202, which initiates the payment request process. In still even another of these embodiments, the identification of the good or service associated with the scanned barcode data is also provided to the payment terminal 202 for forwarding to the authorization server 220. In yet another of these embodiments, the identification associated with the scanned barcode data provides additional identification of the good or service independent of the code entered by the recipient and may be used to validate the user's request. In other embodiments, other sources provide independent identification of the good or service, including manual entry of an identification code by the provider, or retrieval of the information by the payment terminal 202.

The authorization server determines whether the recipient is authorized to receive the at least one of the healthcare-related service and the healthcare-related good from the identified provider (304). In one embodiment, a rules engine 224 on the authorization server 220 determines whether the recipient is authorized to receive the at least one of the healthcare-related service and the healthcare-related good from the identified provider. In another embodiment, the authorization server 220 determines whether an enumeration of approved providers includes the identified provider; for example, the authorization server 220 may contain or retrieve a mapping between approved providers and provider identifiers to make the determination.

The authorization server determines whether the at least one of the CPT code, the ICD code, the FDA drug identifier, the HCPCS code, and the CMS-recognized expense code identifies at least one of the healthcare-related service and the healthcare-related good approved for purchase by the recipient (306). In one embodiment, a rules engine 224 on the authorization server 220 determines whether the recipient is authorized to receive the at least one of the healthcare-related service and the healthcare-related good. In another embodiment, the authorization server 220 determines whether an enumeration of approved goods and services includes the received code or identifier. In still another embodiment, and by way of example, the authorization server 220 identifies requirements for treatment of an injury such as a herniated disc, including an expense of the treatment, a cumulative count of treatments, and a permissible charge for the treatment. In still even another embodiment, the authorization server 220 determines whether the received information satisfies the identified requirements. In another example, the authorization server 220 identifies that a particular recipient of insurance settlement funds has been authorized to receive a prescription drug—such as, for example, Topamax—in a certain dosage, at a specified expense and for cumulative count of the prescription drug (for example, for up to 3 refills) and determines whether to authorize the request based upon the identified information.

In one embodiment, the authorization server 220 accesses a mapping associating identifiers of providers, goods and services with instructions regarding whether to approve or deny requests for the identified goods and services when provided by the identified providers. In another embodiment, the authorization server 220 access one or more mappings associating approved services and goods with at least one of a CPT code, an ICD code, an FDA drug identifier, an HCPCS code, and an expense code recognized by CMS. In still another embodiment, the payment terminal 202 may transmit, to the authorization server 220, data received from one or more individuals and their respective bank cards such as, by way of example, and without limitation, the following:

Johnson requested approval of a purchase of Oxycodone and of aspirin and provided corresponding claim numbers (via, for example, data stored on a bank card used to make the request), provider identification and medical codes. John Smith has requested approval of a purchase of Oxycodone and of cough syrup, as well as payment for at least one X-Ray and at least one physical therapy session, and provided corresponding claim numbers (via, for example, data stored on a bank card used to make the request), provider identification and medical codes for all items except the cough syrup.

In one embodiment, the authorization server 220 compares data received from the payment terminal to data identifying authorized goods, services, and providers. For example, and without limitation, the authorization server 220 may receive—from, for example, a server 106b maintained by an MSPS-compliance company—a table such as the following identifying approved items for particular individuals:

| Claimant Name | Claim Number | Health Insurance Claim Number | Provider ID | Approved Medical Description | Medical Code |
|---|---|---|---|---|---|
| Betty Johnson | Y0123BK | 111-11-1111A | 12AS34DF | Oxycodone | 724.2 |
| John Smith | 65NTF344560 | 222-22-2222A | 98LK6554I | Oxycodone | 724.2 |
| John Smith | 65NTF344560 | 222-22-2222A | 98LK6554I | X-Ray | 615.4 |
| John Smith | 65NTF344560 | 222-22-2222A | 98LK6554I | Physical Therapy | 489.5 |

In one embodiment, the authorization server 220 uses the received data to determine whether an entry exists for the requested item and rejects the request if no entry exists for any received field (e.g., no such claimant, claim, provider ID, medical code, or approved medical description). In another embodiment, (not shown in the table above), the authorization server 220 uses the received data to determine whether an entry exists for the requested item and makes an authorization request based upon data associated with an identified entry. For example, an entry might indicate that should Betty Johnson request Oxycodone from a specified provider, the authorization server 220 should grant the request but if she should request cough syrup from a specified provider, the authorization server 220 should deny the request.

In some embodiments, the authorization server 220 generates a data structure storing at least one identification of an authorization request. In one of these embodiments, the authorization server 220 transmits the generated data struc-

| Claimant Name | Claim Number | Health Insurance Claim Number | Provider ID | Medical Description | Medical Code |
|---|---|---|---|---|---|
| Betty Johnson | Y0123BK | 111-11-1111A | 12AS34DF | Oxycodone | 724.2 |
| Betty Johnson | Y0123BK | 111-11-1111A | 12AS34DF | Aspirin | 1234 |
| John Smith | 65NTF344560 | 222-22-2222A | 98LK6554I | Oxycodone | 724.2 |
| John Smith | 65NTF344560 | 222-22-2222A | 98LK6554I | X-Ray | 615.4 |
| John Smith | 65NTF344560 | 222-22-2222A | 98LK6554I | Cough Syrup | |
| John Smith | 65NTF344560 | 222-22-2222A | 98LK6554I | Physical Therapy | 489.5 |

In the table above, the payment terminal 202 has transmitted, to the authorization server 220, an identification of two individuals—Betty Johnson and John Smith—requesting approval of a plurality of treatments. In this example, Betty ture to the payment terminal 202. In another of these embodiments, the authorization server 220 transmits the generated data structure to a server 106b maintained by an MSPS-compliance company for tracking of claimant expenditures.

In still another of these embodiments, for example, and without limitation, the authorization server 220 transmits data such as the following:

| Claimant Name | Claim Number | Health Insurance Claim Number | Provider ID | Medical Description | Medical Code | Response |
|---|---|---|---|---|---|---|
| Betty Johnson | Y0123BK | 111-11-1111A | 12AS34DF | Oxycodone | 724.2 | Accept |
| Betty Johnson | Y0123BK | 111-11-1111A | 12AS34DF | Aspirin | 1234 | Reject |
| John Smith | 65NTF344560 | 222-22-2222A | 98LK6554I | Oxycodone | 724.2 | Accept |
| John Smith | 65NTF344560 | 222-22-2222A | 98LK6554I | X-Ray | 615.4 | Accept |
| John Smith | 65NTF344560 | 222-22-2222A | 98LK6554I | Cough Syrup | | Reject |
| John Smith | 65NTF344560 | 222-22-2222A | 98LK6554I | Physical Therapy | 489.5 | Accept |

In the example above, the authorization server 220 approves a request by one individual for a particular healthcare-related good or service—such as Betty Johnson's request for payment of a prescription for Oxycodone or John Smith's request for payment of an X-ray. For example, the authorization server 220 may have determined that based upon received information, an entry existed in the data accessible to the authorization server 220 identifying both the received identifications of goods or services and an instruction to authorize payment of such items. In the example above, the authorization server 220 determined that the data available to its rules engine did not include an identification of cough syrup in an enumeration of goods and services approved for purchase by John Smith or of aspirin in an enumeration of goods and services approved for purchase by Betty Johnson and, therefore, the authorization server 220 rejected both requests.

The authorization server transmits, to the payment terminal, an approval of the transfer of the at least a portion of the insurance settlement funds, responsive to a determination that the at least one of the CPT code, the ICD code, the FDA drug identifier, the HCPCS, and the CMS-recognized expense code identifies at least one of a healthcare-related service and a healthcare-related good approved for purchase by the recipient and that the recipient is authorized to receive the at least one of the healthcare-related service and the healthcare-related good from the identified provider (308). In one embodiment, the authorization server 220 transmits the approval to the payment terminal 202 over a network 104.

In some embodiments, the authorization server 220 determines that the recipient is not authorized to receive the at least one of the healthcare-related service and the healthcare-related good from the provider. In one of these embodiments, by way of example, the recipient may have attempted to use an unauthorized doctor or pharmacist to fill a prescription or provide durable medical equipment. In another of these embodiments, the authorization server 220 transmits, to the payment terminal 202, a rejection of the transfer of the at least a portion of the insurance settlement funds. In still another of these embodiments, the authorization server 220 transmits, to the MSPS-compliance company, an identification of the rejection of the transfer of the at least a portion of the insurance settlement funds; for example, the authorization server 220 may transmit the identification to an expenditure management component 230.

In other embodiments, the authorization server 220 determines that the at least one of the healthcare-related service and the healthcare-related good is not approved for purchase by the recipient. In one of these embodiments, by way of example, the recipient may have attempted to purchase a prescription drug not approved for the condition for which the insurance settlement funds were disbursed. In another of these embodiments, the authorization server 220 transmits, to the payment terminal 202, a rejection of the transfer of the at least a portion of the insurance settlement funds. In still another of these embodiments, the authorization server 220 transmits, to the MSPS-compliance company, an identification of the rejection of the transfer of the at least a portion of the insurance settlement funds; for example, the authorization serve 220 may transmit the identification to an expenditure management component 230.

Figure 4:
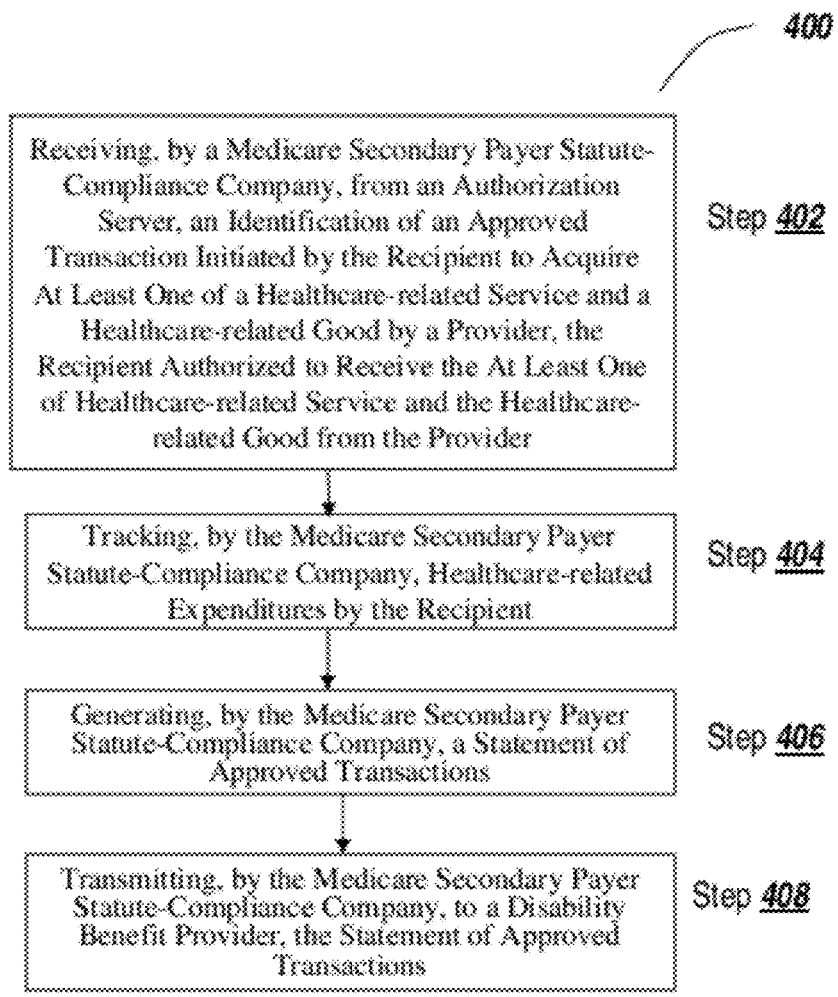
FIG. 4 is a flow diagram depicting one embodiment of a method for tracking health-related spending for validation of disability benefits claims.

Referring now to FIG. 4, a flow diagram depicts one embodiment of a method 400 for tracking health-related spending for validation of benefits claims. In brief overview, the method includes receiving, by a Medicare Secondary Payer statute-compliance company, from an authorization server, an identification of an approved transaction initiated by a recipient of insurance settlement funds to acquire at least one of a healthcare-related service and a healthcare-related good by a provider, the recipient authorized to receive the at least one of the healthcare-related service and the healthcare-related good from the provider (402). The method includes tracking, by the Medicare Secondary Payer statute-compliance company, healthcare-related expenditures by the recipient (404). The method includes generating, by the Medicare Secondary Payer statute-compliance company a statement of approved transactions (406). The method includes transmitting, by the Medicare Secondary Payer statute-compliance company, to a disability benefit provider, the statement of approved transactions (408).

In one embodiment, an insurance company transfers, to a bank account associated with a recipient of insurance settlement funds, at least a portion of the insurance settlement funds. In one embodiment, the insurance company transfers a lump sum payment of insurance settlement funds. In another embodiment, the insurance company makes periodic payments of portions of the insurance settlement funds; for example, the insurance company may make periodic annuity payments. In some embodiments, the insurance company or the MSPS-compliance company specifies that, in the event of the death of the recipient of the insurance settlement funds, a third party—such as an insurer, third-party administrator, self-administrator, or other entity—is to receive the insurance settlement funds remaining in the bank account. In one of these embodiments, upon receipt of a notification that the recipient has died, the MSPS-compliance company instructs the authorization server to direct the transfer of funds to the third party.

Referring now to FIG. 4, and in greater detail, the MSPS-compliance company receives, from an authorization server, an identification of an approved transaction initiated by the recipient to acquire at least one of a healthcare-related service and a healthcare-related good by a provider, the recipient authorized to receive the at least one of the healthcare-related service and the healthcare-related good from the provider (402). In one embodiment, the authorization server 220 transmits, to an expenditure management component 230, the identification of the approved transaction. In another embodiment, the authorization server 220 transmits, to a server 106b maintained by the MSPS-compliance company, the identification of the approved transaction.

The MSPS-compliance company tracks healthcare-related expenditures by the recipient (404). In some embodiments, the MSPS-compliance company extracts data to be used for predictive analysis for clients in the industry. In one of these embodiments, data from actual treatment usage compared to forecasted usage can be used to construct statistical inference models that can benefit future MSA applications. In another of these embodiments, for example, post settlement expenditures by various data sets such as injury or illness, age, sex or other markers can be analyzed in order to more clearly estimate future MSA forecasts. In other embodiments, the MSPS-compliance company tracks an amount of money remaining in an account after the completion of an authorized transaction.

The MSPS-compliance company generates a statement of approved transactions (406). In one embodiment, the statement complies with the reporting requirements of the CMS MSP statutes. In another embodiment, the reports include information such as, by way of example, claimant name, health insurance claim number, date of incident, total amount of the settlement, and a statement from the claimant attesting to have received a certain amount and agreeing to use the funds for certain specific expenses. For example, and without limitation, a statement by a claimant receiving workers compensation funds may be as follows:

"I, undersigned, attest that I have received a lump sum Workers Compensation Medicare Set Aside Arrangement (WCMSA) and have used the monies from the WCMSA account for the period of _____ to _____ to pay for the following:
Medical Services: $_____
Prescription Drug Expenses $_____
"I acknowledge and understand that failure to follow any of the Medicare requirements for the use of this money will be regarded as a failure to reasonably recognize Medicare's interests and that Medicare will deny coverage for all medical treatments and prescription drug expenses due to my work-related injuries up to the total CMS approved WCMSA amount".

In one embodiment, the MSPS-compliance company may sign a statement acting as an agent to an MSA arrangement. In some embodiments, the MSPS-compliance company provides a detailed schedule of approved expenditures. By way of example, a schedule of approved expenses may include information in a schedule such as the following:

| Date | Treatment | Provider | Expense | |
|---|---|---|---|---|
| Jan. 15, 2009 | X-Ray of Back | SRI Diagnostics | $ | 185.50 |
| Mar. 12, 2009 | Physical Therapy Back | ABC Phy Therapist | $ | 100.00 |
| Mar. 14, 2009 | Prescription: Oxycotin | Walgreens Pharm | $ | 80. |
| Total 2009: | | | $ | 365 |
| Original MSA: | | | $20,000 | |
| Interest accrued: | | | $ | 500 |
| Remaining Balance: | | | $20,135 | |

In another embodiment, the MSPS-compliance company or financial services institution or other report-preparation agency, may include with a schedule of approved expenditures a statement such as the following:

"I (financial services institution), acting as authorized agent for _____ confirm that _____'s MSA funds were used specifically for the expenses relating to the WCMSA. I acknowledge and understand that failure to follow any of the Medicare requirements for the use of this money will be regarded as a failure to reasonably recognize Medicare's interests and that Medicare will deny coverage for all medical treatments and prescription drug expenses due to _____'s work-related injuries up to the total CMS approved WCMSA amount".

The MSPS-compliance company transmits, to a disability benefit provider, the statement of approved transactions (408). In one embodiment, the MSPS-compliance company transmits a statement of approved transaction to CMS in compliance with MSP reporting requirements, with copies to the claimant. In another embodiment, the statement contains an affidavit of compliance in which the signing entity or individual accepts responsibility for non-compliance.

In many embodiments, the death of the recipient triggers logical certainty that the recipient will never need Medicare treatment. In that event, a carrier's indemnification of the fund—a fund created by the carrier to benefit Medicare—ends and the money should revert back to the carrier that funded the MSA and not pass to the estate of the recipient. The carrier (the insurance company, third-party administrator, self-administrator, or other entity that funded the Medicare Set Aside arrangement and settlement proceeds) has the right to do this under various CMS memoranda, and more importantly, while not specifically delineated in the statute, a reversionary interest tracks its intent. In some circumstances, however, once having paid the insurance settlement funds, asserting the right to receive the money remaining in the fund at the time of the death of the recipient becomes a collections action and the practicalities of retrieving the money are sufficiently challenging that, in many cases, the carrier cannot receive the remaining funds.

In some embodiments, therefore, the methods and systems described herein allow the insurance company, third-party administrator, self-administrator, or other entity that funded the Medicare Set Aside arrangement and settlement proceeds to specify to the MSPS-compliance company that, in the event of the death of the recipient of the insurance settlement funds, the party that funded the Medicare Set Aside allocation should automatically receive a transfer of its reversionary interest in those funds remaining in the bank account as is proscribed by Medicare. In one of these embodiments, upon receipt of a notification that the recipient has died, the MSPS-compliance company instructs the authorization server to direct the transfer of funds to the third party. In another of these embodiments, the insurance company, third-party administrator, self-administrator, or other entity that funded the Medicare Set Aside arrangement and settlement proceeds may request notification of such reversionary right within a waiting period or upon a discretionary review on the release or transfer of funds. In another of these embodiments, the insurance company, third-party administrator, self-administrator, or other entity that funded the Medicare Set Aside arrangement and settlement proceeds may authorize a deductible amount to authorize. In this embodiment, any funds remaining in the bank account in excess of the deductible amount will automatically transfer per the carrier's reversionary interest in those funds remaining as proscribed by Medicare.

In some embodiments, implementing the methods and systems described herein results in creation of a restrictive-services medical payments card and in the implementation of a process for complying with the requirements of the CMS, particularly for the Medicare Set Aside industry. In one of these embodiments, the methods and systems described herein result in a process for approving only those disbursements that are related to the conditions for medical expenses in compliance with CMS requirements. In another of these embodiments, this process ensures that MSA fund disbursements are restricted to the agreed-upon conditions for maintaining the claimant's future Medicare eligibility. In still another of these embodiments, this process also ensures that CMS annual reporting requirements are strictly adhered to. In yet another of these embodiments, the systems described herein include a specific disbursement bank card that provides restrictive disbursement approval. In some embodiments, the methods described herein provide unique identification numbers for authorized expenses recognized by bank approval processes, which transforms and expands traditional bank card capabilities. In other embodiments, use of the methods and systems described herein provides improved assurance to claimants of future Medicare eligibility regarding the treatment of the specified injury/illness and improved assurance to insurers and claimant attorneys that the claimant complies with CMS requirements.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for tracking health-related spending, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method comprising:
   determining, by a processor of a computing device, one or more approved healthcare products, wherein:
   the one or more approved healthcare products comprise one or more of a healthcare-related service and a healthcare-related good,
   the one or more approved healthcare products are selected from a plurality of healthcare products,
   the one or more approved healthcare products are identified as being relevant to at least one of an injury and an illness associated with a recipient of insurance settlement funds, wherein the insurance settlement funds relate to an insurance claim, and
   the one or more approved healthcare products are approved in accordance with a Medicare Secondary Payer statute;
   identifying, by the processor, an amount of money to allocate to a settlement fund account based in part upon the one or more approved healthcare products;
   receiving an original settlement amount comprising a portion of the insurance settlement funds;
   establishing, by the processor, the settlement fund account, wherein the settlement fund account comprises account information, and wherein the account information comprises an account balance and the original settlement amount;
   establishing, between a Medicare Secondary Payer statute-compliance server and an authorization server, a secure connection;
   providing, to the authorization server, product information identifying at least one approved healthcare product of the one or more approved healthcare products, wherein the product information is provided across the secure connection;
   receiving, from the authorization server, an identification of approval of a transaction,
   wherein the transaction corresponds to (a) the recipient of insurance settlement funds, (b) a first approved healthcare product of the one or more approved healthcare products, and (c) a provider of the first approved healthcare product,
   and wherein the identification of approval indicates that the product information identifies the first approved healthcare product, and wherein the identification of approval comprises at least three of a claimant name, a claim number, a provider identification, a medical description, a medical code, and a health insurance claim number;
   updating, by the processor, a number of repetitions associated with the first approved healthcare product, wherein the first approved healthcare product comprises at least one of a prescription or a treatment;
   determining, by the processor, an expense associated with the transaction;
   accessing, by the processor, the account information of the settlement fund account;
   deducting, by the processor, the expense from the account balance of the settlement fund account;
   determining, by the processor, expenditures from the account information of the settlement fund account, wherein the expenditures comprise the expense;
   determining, by the processor, a statement of approved transactions, wherein the statement of approved transactions comprises:
   a plurality of approved transactions, wherein each approved transaction of the plurality of approved transactions comprises at least three of date information, treatment information, provider information, and expense information,
and the account balance;
transmitting, to a disability benefit provider, the statement of approved transactions in compliance with Medicare Secondary Payer reporting requirements; and
providing a comparison of at least the expenditures to projected expenditures for statistical data analysis, wherein statistical data analysis comprises determining expenditure actuarial behaviors by one or more of an age, sex, injury category, illness category, and occupation category.

2. The method of claim 1, further comprising:
receiving an indication of death of the recipient;
determining, by the processor, a third party associated with the settlement fund account; and
providing an instruction, to the authorization server, to transfer a portion of the account balance to the third party.

3. The method of claim 1, wherein the statement of approved transactions further comprises a statement from the recipient attesting to having received the original settlement amount and agreeing to use the original settlement amount for payment of the plurality of approved transactions.

4. The method of claim 1, wherein statistical data analysis further comprises summarizing a level of risk of liability created by the recipient of insurance settlement funds.

5. The method of claim 1, wherein the statement of approved transactions further comprises an affidavit of compliance, wherein the recipient agrees through the affidavit of compliance to accept responsibility for non-compliance.

6. The method of claim 1, wherein the Medicare Secondary Payer statute-compliance server comprises the processor.

7. The method of claim 1, wherein the processor comprises a plurality of processors.

8. The method of claim 7, wherein the computing device comprises a plurality of computing devices.

9. The method of claim 1, wherein the authorization server comprises a plurality of computing devices.

10. An apparatus comprising:
a processor;
memory storing instructions thereon that, when executed, cause the processor to:
determine one or more approved healthcare products, wherein
the one or more approved healthcare products comprise one or more of a healthcare-related service and a healthcare-related good,
the one or more approved healthcare products are selected from a plurality of healthcare products,
the one or more approved healthcare products are identified as being relevant to at least one of an injury and an illness associated with a recipient of insurance settlement funds, wherein the insurance settlement funds relate to an insurance claim, and
the one or more approved healthcare products are approved in accordance with a Medicare Secondary Payer statute;
identify an amount of money to allocate to a settlement fund account based in part upon the one or more approved healthcare products;
receive an original settlement amount comprising a portion of the insurance settlement funds;
establish the settlement fund account, wherein the settlement fund account comprises account information, and wherein the account information comprises an account balance and the original settlement amount;
establish, between a Medicare Secondary Payer statute-compliance server and an authorization server, a secure connection;
provide, to the authorization server, product information identifying at least one approved healthcare product of the one or more approved healthcare products, wherein the product information is provided across the secure connection;
receive, from the authorization server, an identification of approval of a transaction,
wherein the transaction corresponds to (a) the recipient of insurance settlement funds, (b) a first approved healthcare product of the one or more approved healthcare products, and (c) a provider of the first approved healthcare product,
and wherein the identification of approval indicates that the product information identifies the first approved healthcare product, and wherein the identification of approval comprises at least three of a claimant name, a claim number, a provider identification, a medical description, a medical code, and a health insurance claim number;
update a number of repetitions associated with the first approved healthcare product, wherein the first approved healthcare product comprises at least one of a prescription or a treatment;
determine an expense associated with the transaction;
access the account information of the settlement fund account;
deduct the expense from the account balance of the settlement fund account;
determine expenditures from the account information of the settlement fund account, wherein the expenditures comprise the expense;
determine a statement of approved transactions, wherein the statement of approved transactions comprises:
a plurality of approved transactions, wherein each approved transaction of the plurality of approved transactions comprises at least three of date information, treatment information, provider information, and expense information,
and the account balance;
transmit, to a disability benefit provider, the statement of approved transactions in compliance with Medicare Secondary Payer reporting requirements; and
provide a comparison of at least the expenditures to projected expenditures for statistical data analysis, wherein statistical data analysis comprises determining expenditure actuarial behaviors by one or more of an age, sex, injury category, illness category, and occupation category.

11. A non-transitory computer readable medium, the computer readable medium comprising instructions that, when executed, cause a processor to:
determine one or more approved healthcare products, wherein
the one or more approved healthcare products comprise one or more of a healthcare-related service and a healthcare-related good,
the one or more approved healthcare products are selected from a plurality of healthcare products,
the one or more approved healthcare products are identified as being relevant to at least one of an injury and an illness associated with a recipient of insurance settlement funds, wherein the insurance settlement funds relate to an insurance claim, and
the one or more approved healthcare products are approved in accordance with a Medicare Secondary Payer statute;

identify an amount of money to allocate to a settlement fund account based in part upon the one or more approved healthcare products;
receive an original settlement amount comprising a portion of the insurance settlement funds;
establish the settlement fund account, wherein the settlement fund account comprises account information, and wherein the account information comprises an account balance and the original settlement amount;
establish, between a Medicare Secondary Payer statute-compliance server and an authorization server, a secure connection;
provide, to the authorization server, product information identifying at least one approved healthcare product of the one or more approved healthcare products, wherein the product information is provided across the secure connection;
receive, from the authorization server, an identification of approval of a transaction,
wherein the transaction corresponds to (a) the recipient of insurance settlement funds, (b) a first approved healthcare product of the one or more approved healthcare products, and (c) a provider of the first approved healthcare product,
and wherein the identification of approval indicates that the product information identifies the first approved healthcare product, and wherein the identification of approval comprises at least three of a claimant name, a claim number, a provider identification, a medical description, a medical code, and a health insurance claim number;
update a number of repetitions associated with the first approved healthcare product, wherein the first approved healthcare product comprises at least one of a prescription or a treatment;
determine an expense associated with the transaction;
access the account information of the settlement fund account;
deduct the expense from the account balance of the settlement fund account;
determine expenditures from the account information of the settlement fund account, the expenditures comprise the expense;
determine a statement of approved transactions, wherein the statement of approved transactions comprises:
a plurality of approved transactions, wherein each approved transaction of the plurality of approved transactions comprises at least three of date information, treatment information, provider information, and expense information,
and the account balance;
transmit, to a disability benefit provider, the statement of approved transactions in compliance with Medicare Secondary Payer reporting requirements; and
provide a comparison of at least the expenditures to projected expenditures for statistical data analysis, wherein statistical data analysis comprises determining expenditure actuarial behaviors by one or more of an age, sex, injury category, illness category, and occupation category.

12. A method comprising:
determining, by a processor of a computing device, one or more approved healthcare products, wherein:
the one or more approved healthcare products comprise one or more of a healthcare-related service and a healthcare-related good,
the one or more approved healthcare products are selected from a plurality of healthcare products,
the one or more approved healthcare products are identified as being relevant to at least one of an injury and an illness associated with a recipient of insurance settlement funds, wherein the insurance settlement funds relate to an insurance claim, and
the one or more approved healthcare products are approved in accordance with a Medicare Secondary Payer statute;
identifying, by the processor, an amount of money to allocate to a settlement fund account based in part upon the one or more approved healthcare products;
receiving an original settlement amount comprising a portion of the insurance settlement funds;
establishing, by the processor, the settlement fund account, wherein the settlement fund account comprises account information, and wherein the account information comprises an account balance and the original settlement amount;
establishing, between a Medicare Secondary Payer statute-compliance server and an authorization server, a secure connection;
providing, to the authorization server, product information identifying at least one approved healthcare product of the one or more approved healthcare products, wherein the product information is provided across the secure connection;
receiving, from the authorization server, an identification of approval of a transaction,
wherein the transaction corresponds to (a) the recipient of insurance settlement funds, (b) a first approved healthcare product of the one or more approved healthcare products, and (c) a provider of the first approved healthcare product,
and wherein the identification of approval indicates that the product information identifies the first approved healthcare product, and wherein the identification of approval comprises at least three of a claimant name, a claim number, a provider identification, a medical description, a medical code, and a health insurance claim number;
updating, by the processor, a number of repetitions associated with the first approved healthcare product, wherein the first approved healthcare product comprises at least one of a prescription or a treatment;
determining, by the processor, an expense associated with the transaction;
accessing, by the processor, the account information of the settlement fund account;
deducting, by the processor, the expense from the account balance of the settlement fund account;
determining, by the processor, expenditures from the account information of the settlement fund account, wherein the expenditures comprise the expense;
determining, by the processor, a statement of approved transactions, wherein the statement of approved transactions comprises:
a plurality of approved transactions, wherein each approved transaction of the plurality of approved transactions comprises at least three of date information, treatment information, provider information, and expense information,
and the account balance;
transmitting, to a disability benefit provider, the statement of approved transactions in compliance with Medicare Secondary Payer reporting requirements;
providing a comparison of at least the expenditures to projected expenditures for statistical data analysis, wherein statistical data analysis comprises determining expenditure actuarial behaviors by one or more of an age, sex, injury category, illness category, and occupation category;

receiving an indication of death of the recipient;

determining, by the processor, a third party associated with the settlement fund account; and providing an instruction, to the authorization server, to transfer a portion of the account balance to the third party.

13. The method of claim 12, wherein the Medicare Secondary Payer statute-compliance server comprises the processor.

14. The method of claim 12, wherein the processor comprises a plurality of processors.

15. The method of claim 12, wherein the computing device comprises a plurality of computing devices.

16. An apparatus comprising:

a processor;

memory storing instructions thereon that, when executed, cause the processor to:

determine one or more approved healthcare products, wherein the one or more approved healthcare products comprise one or more of a healthcare-related service and a healthcare-related good, the one or more approved healthcare products are selected from a plurality of healthcare products, the one or more approved healthcare products are identified as being relevant to at least one of an injury and an illness associated with a recipient of insurance settlement funds, wherein the insurance settlement funds relate to an insurance claim, and the one or more approved healthcare products are approved in accordance with a Medicare Secondary Payer statute;

identify an amount of money to allocate to a settlement fund account based in part upon the one or more approved healthcare products;

receive an original settlement amount comprising a portion of the insurance settlement funds;

establish the settlement fund account, wherein the settlement fund account comprises account information, and wherein the account information comprises an account balance and the original settlement amount;

establish, between a Medicare Secondary Payer statute-compliance server and an authorization server, a secure connection;

provide, to the authorization server, product information identifying at least one approved healthcare product of the one or more approved healthcare products, wherein the product information is provided across the secure connection;

receive, from the authorization server, an identification of approval of a transaction, wherein the transaction corresponds to (a) the recipient of insurance settlement funds, (b) a first approved healthcare product of the one or more approved healthcare products, and (c) a provider of the first approved healthcare product, and wherein the identification of approval indicates that the product information identifies the first approved healthcare product, and wherein the identification of approval comprises at least three of a claimant name, a claim number, a provider identification, a medical description, a medical code, and a health insurance claim number;

update a number of repetitions associated with the first approved healthcare product, wherein the first approved healthcare product comprises at least one of a prescription or a treatment;

determine an expense associated with the transaction;

access the account information of the settlement fund account;

deduct the expense from the account balance of the settlement fund account;

determine expenditures from the account information of the settlement fund account, wherein the expenditures comprise the expense;

determine a statement of approved transactions, wherein the statement of approved transactions comprises:

a plurality of approved transactions, wherein each approved transaction of the plurality of approved transactions comprises at least three of date information, treatment information, provider information, and expense information, and the account balance;

transmit, to a disability benefit provider, the statement of approved transactions in compliance with Medicare Secondary Payer reporting requirements;

provide a comparison of at least the expenditures to projected expenditures for statistical data analysis, wherein statistical data analysis comprises determining expenditure actuarial behaviors by one or more of an age, sex, injury category, illness category, and occupation category;

receive an indication of death of the recipient;

determine, by the processor, a third party associated with the settlement fund account; and provide an instruction, to the authorization server, to transfer a portion of the account balance to the third party.

17. A non-transitory computer readable medium, the computer readable medium comprising instructions that, when executed, cause a processor to:

determine one or more approved healthcare products, wherein the one or more approved healthcare products comprise one or more of a healthcare-related service and a healthcare-related good, the one or more approved healthcare products are selected from a plurality of healthcare products, the one or more approved healthcare products are identified as being relevant to at least one of an injury and an illness associated with a recipient of insurance settlement funds, wherein the insurance settlement funds relate to an insurance claim, and the one or more approved healthcare products are approved in accordance with a Medicare Secondary Payer statute;

identify an amount of money to allocate to a settlement fund account based in part upon the one or more approved healthcare products;

receive an original settlement amount comprising a portion of the insurance settlement funds;

establish the settlement fund account, wherein the settlement fund account comprises account information, and wherein the account information comprises an account balance and the original settlement amount;

establish, between a Medicare Secondary Payer statute-compliance server and an authorization server, a secure connection;

provide, to the authorization server, product information identifying at least one approved healthcare product of the one or more approved healthcare products, wherein the product information is provided across the secure connection;

receive, from the authorization server, an identification of approval of a transaction, wherein the transaction corresponds to (a) the recipient of insurance settlement funds, (b) a first approved healthcare product of the one or more approved healthcare products, and (c) a provider of the first approved healthcare product, and wherein the identification of approval indicates that the product information identifies the first approved healthcare product, and wherein the identification of approval comprises at least three of a claimant name, a claim number, a provider identification, a medical description, a medical code, and a health insurance claim number;

update a number of repetitions associated with the first approved healthcare product, wherein the first approved healthcare product comprises at least one of a prescription or a treatment;

determine an expense associated with the transaction;

access the account information of the settlement fund account;

deduct the expense from the account balance of the settlement fund account;

determine expenditures from the account information of the settlement fund account, the expenditures comprise the expense;

determine a statement of approved transactions, wherein the statement of approved transactions comprises:

a plurality of approved transactions, wherein each approved transaction of the plurality of approved transactions comprises at least three of date information, treatment information, provider information, and expense information, and the account balance;

transmit, to a disability benefit provider, the statement of approved transactions in compliance with Medicare Secondary Payer reporting requirements;

provide a comparison of at least the expenditures to projected expenditures for statistical data analysis, wherein statistical data analysis comprises determining expenditure actuarial behaviors by one or more of an age, sex, injury category, illness category, and occupation category;

receive an indication of death of the recipient;

determine, a third party associated with the settlement fund account; and provide an instruction, to the authorization server, to transfer a portion of the account balance to the third party.

* * * * *